United States Patent
Sako

(10) Patent No.: US 7,130,252 B2
(45) Date of Patent: Oct. 31, 2006

(54) OPTICAL RECORDING MEDIUM HAVING MULTIPLE REPRODUCTION MODES

(75) Inventor: Yoichiro Sako, Tokyo (JP)

(73) Assignee: Sony Corporation (JP)

( * ) Notice: Subject to any disclaimer, the term of this patent is extended or adjusted under 35 U.S.C. 154(b) by 456 days.

(21) Appl. No.: 10/088,196

(22) PCT Filed: Jul. 19, 2001

(86) PCT No.: PCT/JP01/06304

§ 371 (c)(1),
(2), (4) Date: Jun. 13, 2002

(87) PCT Pub. No.: WO02/07157

PCT Pub. Date: Jan. 24, 2002

(65) Prior Publication Data

US 2002/0181358 A1    Dec. 5, 2002

(30) Foreign Application Priority Data

Jul. 19, 2000    (JP) .................... P2000-219508

(51) Int. Cl.
*G11B 7/005*    (2006.01)
*G11B 7/24*    (2006.01)

(52) U.S. Cl. .................... 369/47.24; 369/275.3; 369/59.13

(58) Field of Classification Search ............. 369/275.3, 369/47.24, 59.13, 53.37, 53.22
See application file for complete search history.

(56) References Cited

U.S. PATENT DOCUMENTS

| | | | | |
|---|---|---|---|---|
| 5,936,932 | A | * | 8/1999 | Nakane et al. ............ 369/275.3 |
| 6,172,960 | B1 | * | 1/2001 | Takemura et al. ........ 369/275.3 |
| 6,240,055 | B1 | * | 5/2001 | Takamine et al. ........ 369/53.22 |

FOREIGN PATENT DOCUMENTS

JP        03207051 A  *  9/1991

* cited by examiner

*Primary Examiner*—Brian E. Miller
*Assistant Examiner*—Peter Vincent Agustin
(74) *Attorney, Agent, or Firm*—Lerner, David, Littenberg, Krumholz & Mentlik, LLP

(57) ABSTRACT

The present invention provides a recording medium. First data is recorded in the medium, in the form of a track consisting of a plurality of bits. Second data is recorded in the form of a plurality of bits that are displaced in the direction at right angles to the track. The content data representing the contents of the first data is recorded in the recording medium, too. The content data includes identification data that indicates whether the second data is recorded in the recording medium.

11 Claims, 15 Drawing Sheets

| DATA WORD (4BITS) | CODE WORD (5BITS) |
|---|---|
| 0000 | 00101 |
| 0001 | 00110 |
| 0010 | 01001 |
| 0011 | 01010 |
| 0100 | 01011 |
| 0101 | 01100 |
| 0110 | 01101 |
| 0111 | 01110 |
| 1000 | 10001 |
| 1001 | 10010 |
| 1010 | 10011 |
| 1011 | 10100 |
| 1100 | 10101 |
| 1101 | 10110 |
| 1110 | 11001 |
| 1111 | 11010 |

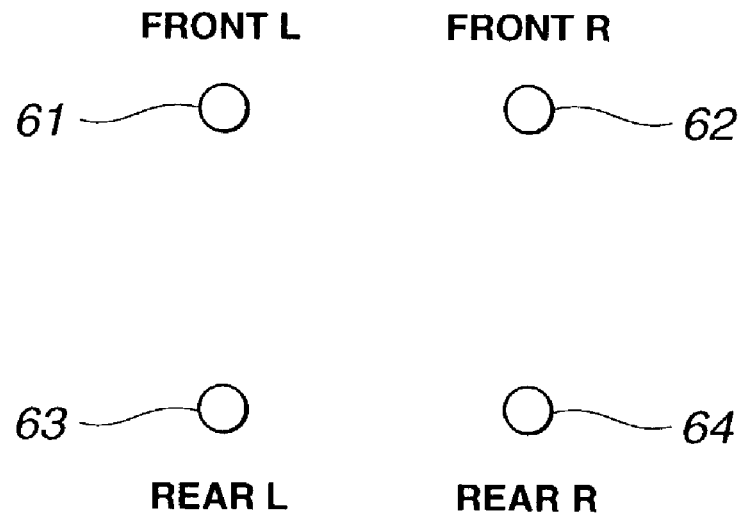
FIG.10
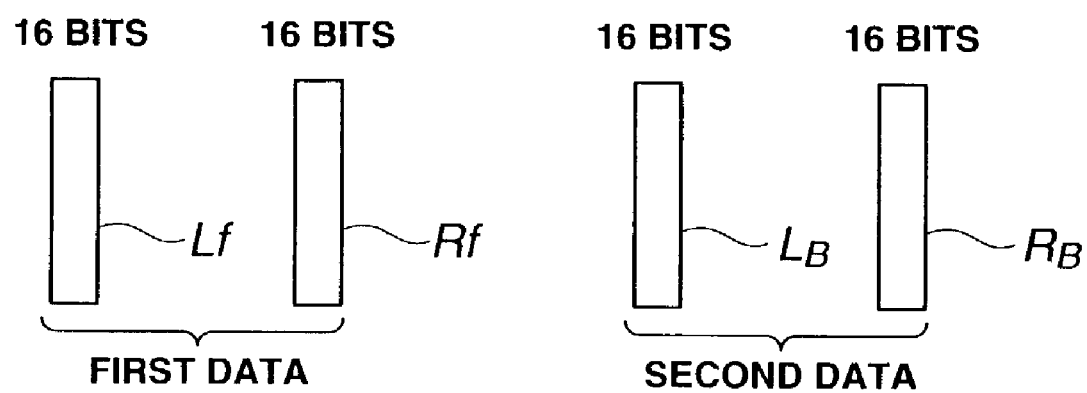
FIG.11A  FIG.11B

OPTICAL RECORDING MEDIUM HAVING MULTIPLE REPRODUCTION MODES

TECHNICAL FIELD

The present invention relates to a recording medium in which first data and second data based on first information and second information, respectively, and an apparatus that reproduces the information recorded on the recording medium. More particularly, the invention relates to an apparatus and method for performing operations on the first data and the second data, thereby to reproduce them, or reproducing the first data and the second data independently.

BACKGROUND ART

As optical discs, compact discs (hereinafter referred to as "CDs") are used in increasing numbers. Audio data is recorded in a CD, by generating blocks of audio data, generating error correction codes, performing EFM (Eight to Fourteen Modulation) on the data blocks, and effecting NRZI (Non Return to Zero Inverted) modulation on the EFM-modulated data blocks.

As the result of the EFM modulation, the audio data is recorded in the CD, in the form of pits and lands that are alternately repeated. The pits and the lands can have nine different lengths 3T to 11T, where T is the fundamental period of the channel clock signal. The pits formed in the CD have a length of 0.87 to 3.18 [μm], a width of about 0.5 [μm] and a depth of about 0.1 [μm]. The range of length, 0.87 to 3.18 [μm], corresponds to 3T to 11T.

The audio data recorded in the CD has been sampled at the frequency of 44.1 [kHz]. It is two-channel data that has been quantized in units of 16 bits. It is demanded that the audio data should represent high-quality sounds and should be multi-channel data. Additionally, the CD should be so designed that the existing CD players may reproduce data from them. Further, it is not desirable that only a short audio program can be recorded in one CD when the data presents high-quality sounds and is multi-channel data.

Moreover, it is now desired that different items of information or related items of information be reproduced from the same CD in various modes.

DISCLOSURE OF THE INVENTION

Accordingly, an object of this invention is to provide a recording medium from which data can be reproduced by the existing apparatuses, which can store data representing high-quality sounds, without shortening the program that can be recorded in it, and to provide an apparatus and method for reproducing data from the recording medium.

Another object of the present invention is to provide an optical recording medium from which first data and second data based on first information and second information, respectively, can be reproduced in various modes, thereby to provide various types of information, and to provide an apparatus and method for reproducing data from the optical recording medium.

The present invention provides a recording medium in which content data is recorded. First data is recorded in the medium, in the form of a track consisting of a plurality of bits. Second data is recorded in the form of a plurality of bits that are displaced in the direction at right angles to the track. The content data representing the contents of the first data is recorded in the recording medium, too. This content data includes identification data that indicates whether the second data is recorded in the recording medium.

This invention provides a method of reproducing data from a recording medium. In the recording medium, the first data or the second data, or both are recorded. The content data representing the contents of the first data is recorded in the medium, too. The first data is recorded in the form of a track consisting of a plurality of pits. The second data is recorded by displacing the pits from the track in a direction at right angles to the track. The content data includes identification data and reproduction-mode identification data. The identification data indicates that the second data is recorded in the medium. The reproduction-mode identification data represents the mode in which the first and the second data are to be reproduced. The method comprises the steps of: determining the type of the recording medium from the identification data read from the recording medium; and reproducing the first data and the second data, both read from the recording medium in accordance with the reproduction-mode identification data, when the second data is found to be recorded in the recording medium.

The invention provides an apparatus for reproducing data from a recording medium. In the recording medium, the first data or the second data, or both are recorded. The content data representing the contents of the first data is recorded in the medium, too. The first data is recorded in the form of a track consisting of a plurality of pits. The second data is recorded by displacing the pits from the track in a direction at right angles to the track. The content data includes identification data and reproduction-mode identification data. The identification data indicates that the second data is recorded in the medium. The reproduction-mode identification data represents the mode in which the first and the second data are to be reproduced. The apparatus comprises: a head section configured to apply a laser beam to the recording medium, thereby to scan the recording medium; a signal-reproducing section configured to reproduce a signal read from the recording medium by the head section; and a control section configured to determine the type of the recording medium from the identification data read from the recording medium by the head section and to cause the signal-reproducing section to reproduce the first data and the second data, both read from the recording medium, in accordance with the reproduction-mode identification data, when the second data is found to be recorded in the recording medium.

The other objects of the invention and the advantages attained by the invention will be apparent from the embodiments of the invention, which will be described below.

BRIEF DESCRIPTION OF THE DRAWINGS

FIG. 10 is a diagram showing a positional relation of the loudspeakers that receive the data signals reproduced from an optical disc of the invention;

FIGS. 11A and 11B are schematic diagrams representing the first data and the second data, both recorded in the optical disc in order to reproduce the information that represents the positions of the loudspeakers shown in FIG. 10;

BEST MODE FOR CARRYING OUT THE INVENTION

Embodiments of the present invention will be described. First, an optical disc according to the invention, which is, for example, a compact disc (CD), will be described.

The optical disc comprises a substrate made of glass or synthetic resin such as polycarbonate resin. First data that corresponds to first information such as audio information or video information is recorded on one surface of the substrate, in the form of a pit pattern consisting of small recesses. The pits constitute a track. Second data that corresponds to second information is recorded on that surface of the substrate, at a position displaced by a prescribed distance from the centerline of the track in the direction at right angles to the track. Further, an identification signal representing the mode of reproducing the first data and the second data is recorded on that surface of the substrate.

Figure 1:
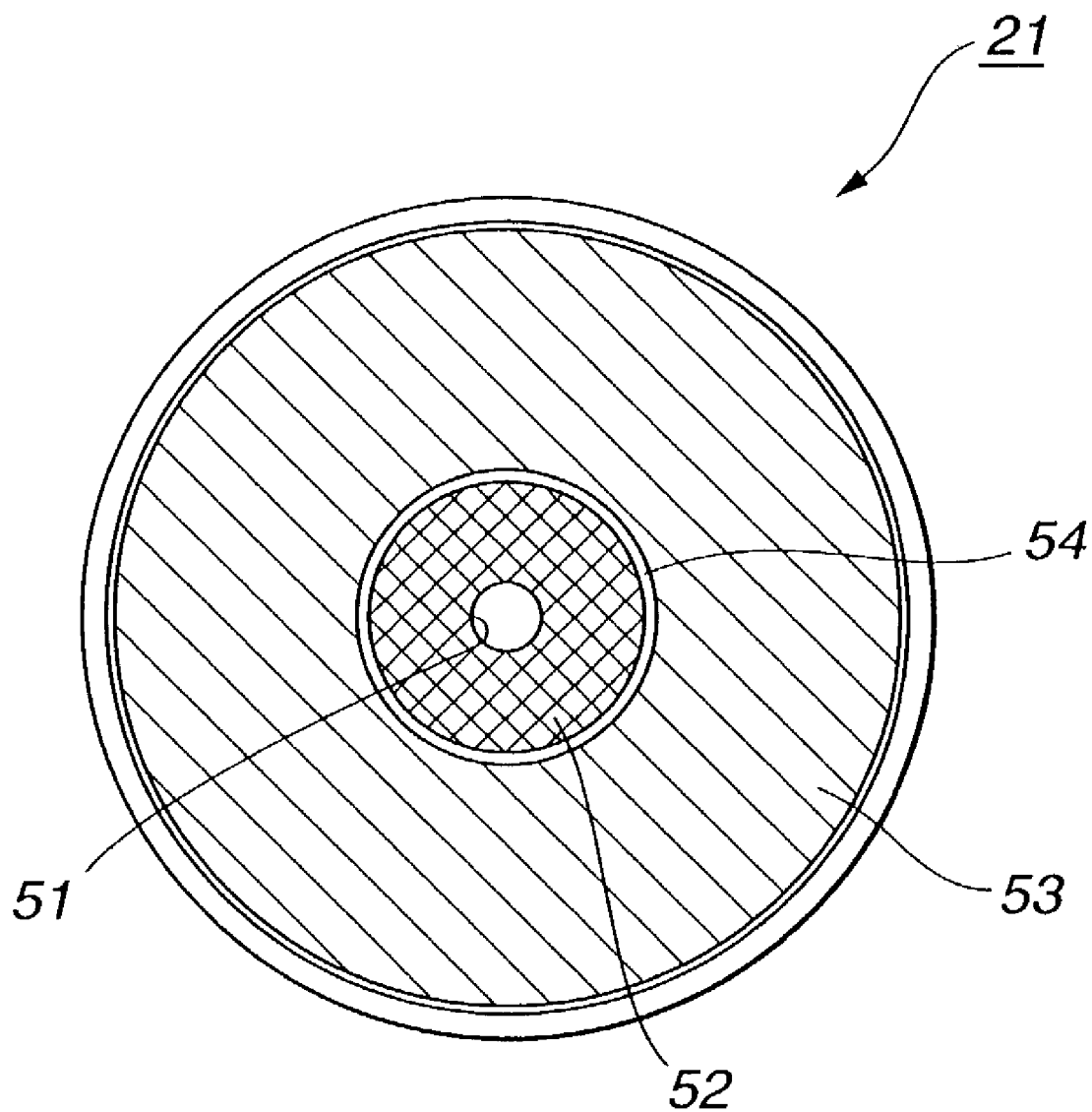
FIG. 1 is a plan view of an optical disc that is an embodiment of an optical recording medium according to this invention.

FIG. 1 shows the optical disc 21. The optical disc 21 has a center hole 51 in its center part. It has a clamping area 52 around the center hole 51. The optical disc 21 may be held by the disc-rotating mechanism provided in an apparatus for reproducing data from optical discs. While the disc 21 remains held in the mechanism, the center ring provided on the disc table of the mechanism fits in the center hole 51. Further, the clamping area 52 is mounted on the disc table and clamped by a clamping member. Thus, the disc 21 is axially aligned with the disc table and can be rotated as the disc table rotates.

As described above, the optical disc 21 has, around its center, a clamping area 52 that can be clamped by the disc-rotating mechanism. Therefore, the disc 21 has a recording area 53 that surrounds the clamping area 52. In the recording area 53 there are recorded the first data and the second data. The optical disc 21 has a read-in area 54, too, in which at least a part of control data is recorded to be read prior to the first and second data, after the optical disc is set in the apparatus configured to reproduce data from optical discs. In the read-in area 54 there is recorded the identification signal that represents the mode of reproducing data, or reproduction-mode identification data Im.

Figure 2:
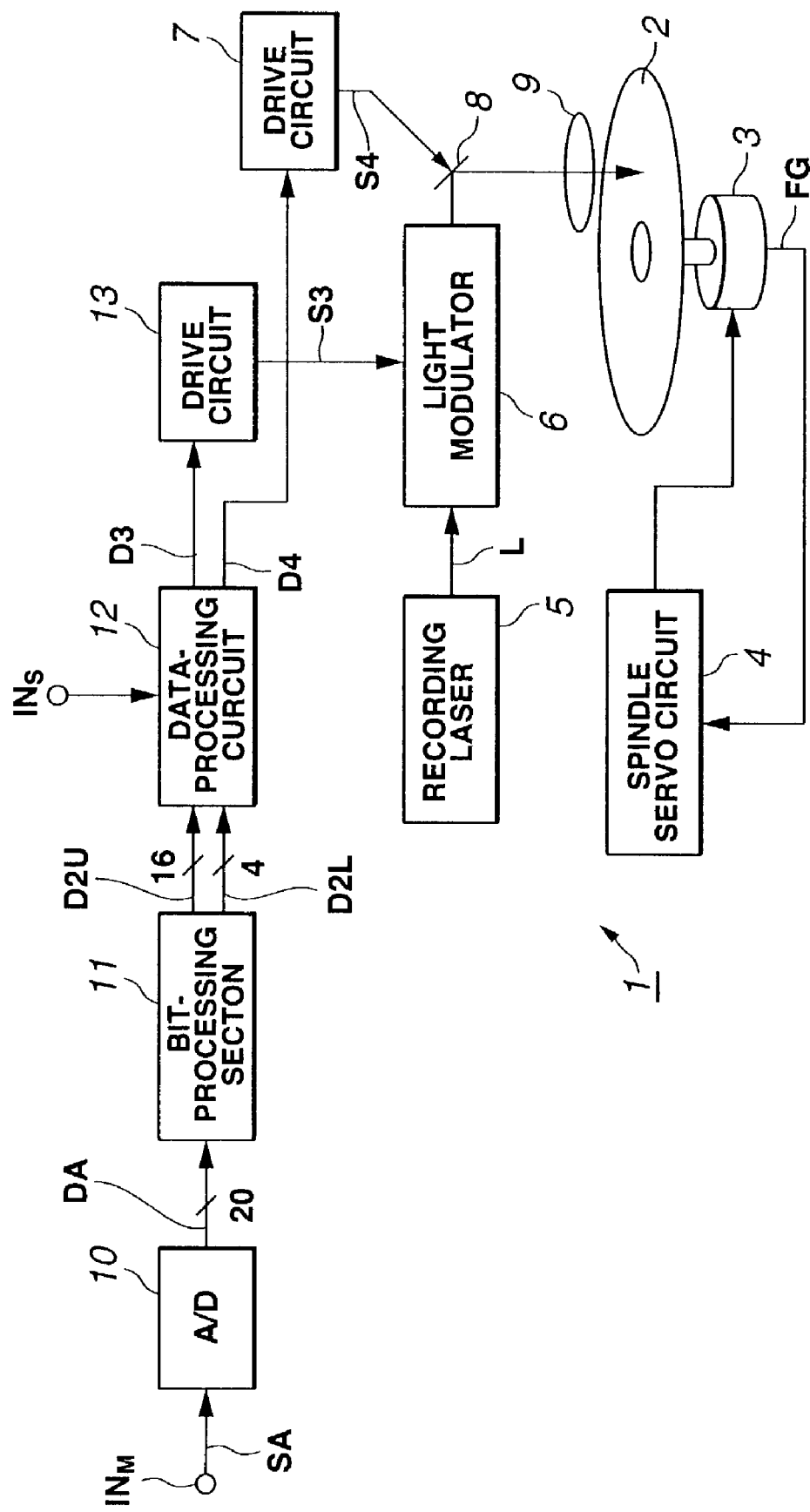
FIG. 2 is a block diagram of a data-recording apparatus designed for use in manufacturing the optical disc shown in FIG. 1.

FIG. 2 illustrates a data-recording apparatus 1 for use in manufacturing the optical disc 21. In the data-recording apparatus 1, a light beam is applied to an original disc 2. The original disc 2 thus exposed to light is subjected to development and electro-casting, thereby providing a mother disc. The mother disc is used, manufacturing the optical disc 21.

The original disc 2 comprises, for example, a flat glass substrate and a photosensitive coating (resist) formed on the glass substrate. In the apparatus 1, a spindle motor 3 rotates the original disc 2 under the control of the spindle servo circuit 4. An FG-signal generator mounted on the bottom of the spindle motor 3 generates an FG signal that rises to the high level every time the shaft of the motor 3 rotates through a predetermined angle. The spindle motor 3 is driven, rotating the original disc 2 at a constant linear velocity (CLV).

The original disc 2 thus exposed to light has been made by coating a flat glass substrate with photosensitive agent (resist). The spindle motor 3 rotates the original disc 2 under the control of the spindle servo circuit 4. As the motor 3 rotates the disc 2, the FG-signal generator mounted on the bottom of the motor 3 generates an FG signal. The FG signal rises to the high level every time the shaft of the spindle motor 3 rotates through the predetermined angle. More precisely, the spindle servo circuit 4 drives the spindle motor 3 in such a way that the FG signal has a prescribed frequency. The original disc 2 is thereby rotated at the constant linear velocity.

The apparatus 1 comprises a recording laser 5, a light modulator 6, and a mirror 8. The recording laser 5 is a gas laser or the like and emits a laser beam of a prescribed intensity. The light modulator 6 is an electro-acoustic transducer or the like and shields the laser beam L emitted from the laser 5 or allows the passage of the laser beam L, in accordance with a drive signal S3. The laser beam output from the light modulator 6 is applied to the mirror 8.

The mirror 8 reflects the laser beam L, applying the same to the original disc 2. An objective lens 9 receives the laser beam L the mirror 8 has reflected. It focuses the beam L on the recording surface of the original disc 2. The position of the mirror 8 can be controlled in the direction at right angles to the track, in accordance with a drive signal S4 supplied from the drive circuit 7. Thus, the laser beam L will make pits that are displaced to the left or the right from the direction at right angles to the track. The displacement of the beam L is set, falling within a specific range, so that the data-reproducing laser beam may scan the track, not deviating from the track, and may yet read the pits displaced from the track.

A thread mechanism (not shown) gradually moves the mirror 8 and the objective lens 9 in the radial direction of the original disc 2, in synchronism with the rotation of the original disc 2. The data-recording apparatus 1 forms a spiral track on the original disc 2, as the position at which the laser beam L irradiates the disc 2 is gradually moved toward the outer circumference of the original disc 2. Along this track a train of pits is formed. The train of pits accords with the modulation signal S3. Hence, the train of pits that are displaced from the centerline of the track in accordance with the modulation signal S4 supplied from the drive circuit 7.

The mirror 8 can be replaced by a light deflector that serves to make pits displaced to the left or the right from the centerline of the track. The light deflector may be, for example, an AOD (Acousto-Optic Deflector) or an EOD (Electro-Optic Deflector).

It will be described how to record the first data consisting of upper 16 bits and the second data consisting of lower four bits, as audio information, on the original disc 2 in the data-recording apparatus 1. A data-reproducing apparatus, which will be described later, can reproduce 20-bit audio information representing high-quality sounds, from any recorded optical disc produced by using the original disc 2. The 20-bit audio information is reproduced by mixing the 16-bit first data with the 4-bit second data in accordance with reproduction-mode identification data Im. Audio information of 16 bits/sample, which is similar to the information recorded in the ordinary CD, can be reproduced from the first data.

A specific music source generates an audio signal SA, which is input to an analog/digital (A/D) converter circuit 10 through an input terminal INM. The A/D converter circuit 10 converts the audio signal SA (i.e., analog signal) to a digital signal, or 20-bit, parallel audio data DA, at a sampling frequency of 44.1 [kHz].

The 20-bit, parallel audio data DA is supplied to a bit-processing section 11. The section 11 decomposes and outputs the data DA into 16-bit audio data D2U and 4-bit audio data D2L. The data D2U consists of the upper 16 bits of the audio data DA, while the data D2L consists of the lower four bits of the audio data DA. In other words, the bit-processing section 11 performs two functions. First, it extracts, from the audio data DA, the audio data D2U that represents sound of the same quality as the data reproduced from the conventional compact discs. Second, it generates, from the audio data DA, the data D2L that is added to the audio data D2U to improve the quality of the sound the data D2U represents.

A data-processing circuit 12 receives data from an input terminal INS. This data represents TOC (Table of Contents) to be recorded in the read-in area 54 of the optical disc 21 (FIG. 1). The circuit 12 processes the TOC data, generating channel data of the format specific to the optical disc. Note that the channel data corresponds to the train of pits.

The second mode represented by the reproduction-mode identification data Im may be of such a type as causes the data-reproducing apparatus to output both the first data and the second data when these data items correspond to two independent audio information items.

The second mode represented by the reproduction-mode identification data Im may be of such a type as causes the data-reproducing apparatus to output both the first data and the second data when theses data items correspond to two independent audio information items.

The TOC data contains not only the reproduction-mode identification data Im, but also disc identification data ID and copy identification data IC. The disc identification data ID indicates that the data D2L is recorded in the optical disc 21. The copy identification data IC shows that the optical disc 21 is an original compact disc molded by the use of the mother disc. Therefore, the apparatus for reproducing data from the optical disc 21 can reproduce the audio data DA from the 16-bit audio data D2U and the 4-bit audio data D2L, if the disc identification data ID and the reproduction-mode identification data Im are detected. The apparatus can determine whether the disc 21 is an original compact disc or a copied compact disc, in accordance with the copy identification data IC.

The data-processing circuit 12 receives the audio data D2U output from the bit-processing section 11 and consisting of the upper 16 bits of the of the audio data DA. The circuit 12 processes the audio data D2U, generating channel data D3 having the format specific to, for example, compact discs. The channel data D3, which corresponds to the train of pits, is output from the data-processing circuit 12.

More specifically, the data-processing circuit 12 first adds an error correction code and the like to the audio data D2U, then performs interleave process on the audio data D2U, and carries out EFM modulation on the data D2U interleaved. In the interleave process, the circuit 12 generates 14 channel bits from each byte of the audio data D2U, for a period that is 14 times as long as the fundamental period T and connects the 14 channel bits by using 3 channel connecting bits.

Figure 3:
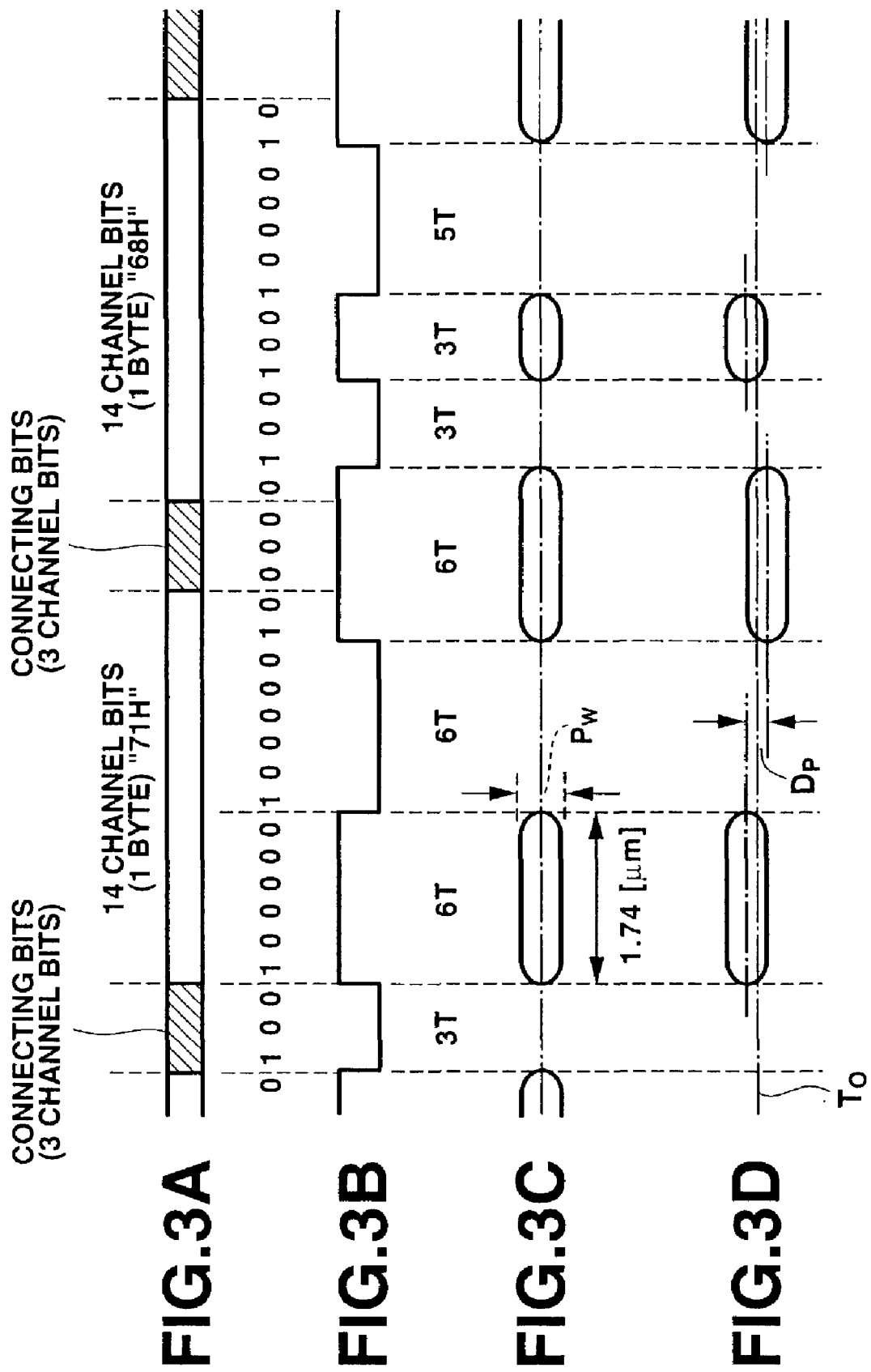
FIGS. 3A to 3D are a diagram for explaining the process of recording data performed in the data-recording apparatus illustrated in FIG. 2.

FIG. 3A represents a part of the EFM-modulated data. The data-processing circuit 12 performs NRZI modulation on a serial data steam, generating channel data D3 (FIG. 3B). A laser beam L is applied to an ordinary compact disc, on and off in accordance with the channel data D3, making a train of pits that have a width of 0.5 [μm]. As indicated above, the mirror 8 deflects the laser beam in the data-recording apparatus 1, whereby each pit is therefore displaced to the left or the right from the centerline of the track.

The data-processing circuit 12 processes the audio data D2U consisting of the upper 16 bits, as unit of data, and adds an error code to the audio data D2L consisting of the lower four bits. The circuit 12 performs the inerleave process on the audio data D2U, converting the data to serial data. At this time, the data-processing circuit 12 applies two parties to 8-bit data items, thereby adding an error correction code. More precisely, the circuit 12 first generates six 8-bit data blocks (48 bits in total) from the audio data items D2L, in the same way as it processes the audio data D2U, and then adds one 4-bit parity to each data block. Further, the circuit 12 effects interleave process on one data block composed of the six 8-bit data blocks (48 bits) and one parity (8bits) and adds an 8-bit parity to this data block.

The data-processing circuit 12 converts the bit train thus generated, into serial data. The circuit 12 generates a displacement control data D4 by allocating the bits of the serial data to the logic levels of the bits that form the channel data D3. To be more specific, the circuit 12 allocates the logic values (0 or 1) of the bits constituting the data generated by processing the data composed of the four lower bits, to the displacement to the left or the right, as is illustrated in FIG. 3D.

As shown in FIG. 2, the drive circuit 13 receives the channel data D3 from the data-processing circuit 12. The circuit 13 generates a drive signal S3 from the channel data D3. The drive signal S3 is supplied to the light modulator 6, which shields the laser beam L emitted from the laser 5 or allows the passage of the laser beam L. Hence, the upper 16 bits of the 20-bit audio data DA are recorded in the original disc 2 and can therefore be reproduced by ordinary compact disc players.

The drive circuit 7 generates a drive signal S4 that drives the mirror 8 so that bits may be made, each displaced to the left and right from the centerline of the track, in accordance with the displacement control data D4. As in the ordinary compact discs, pits corresponding to the upper 16 bits of data will be made in the optical disc 21, each displaced to the left or right from the centerline of the track in accordance with the control data D4. The displacement control data D4 corresponds to the lower four bits. The data-recording apparatus 1 records the data D2L improving the quality of the sound the data D2U represents, in the form of pits that are displaced from the centerline of the track, each representing logic value "0" or logic value "1".

If the displacement control data D4 is recorded in the form of pits that are displaced from the centerline of the track, it changes the tracking error signal RFD as will be described later. This means that the displacement control data D4 can be extracted from the tracking error signal RFD. The data-recording apparatus 1 makes pits in the disc 21, each displaced by a distance of ±50 [nm] as is illustrated in FIG. 3D.

In the data-recording apparatus 1, each 20-bit sample consists of 16 upper bits and lower four bits. The upper 16 bits are recorded in the form of pits and lands. By contrast, the lower four bits are recorded in the form of pits displaced from the centerline of the track. It is therefore required that the 16-bit data and the 4-bit data must remain synchronous with each other. In the signal format of compact discs, for example, one frame includes a fixed number of data words (symbols). The four-bit data is therefore recorded in the same frame as the 16-bit data associated with it. Any other method of maintaining the 16-bit data and the 4-bit data synchronous with each other can be employed. As will be described later in detail, the 16-bit data and the 4-bit data need not be synchronous, depending on the type of data that is recorded in the form of pits displaced from the centerline of the track.

Hereinafter, the optical disc 21 manufactured by using the data-recording apparatus 1 shown in FIG. 2 shall be called "ExCD disc," distinguished from the conventional optical discs. The ExCD disc does not differ from the existing compact disc in that the read-in area 54 and the read-out area are the innermost region and the outermost region, respectively.

Figure 4:
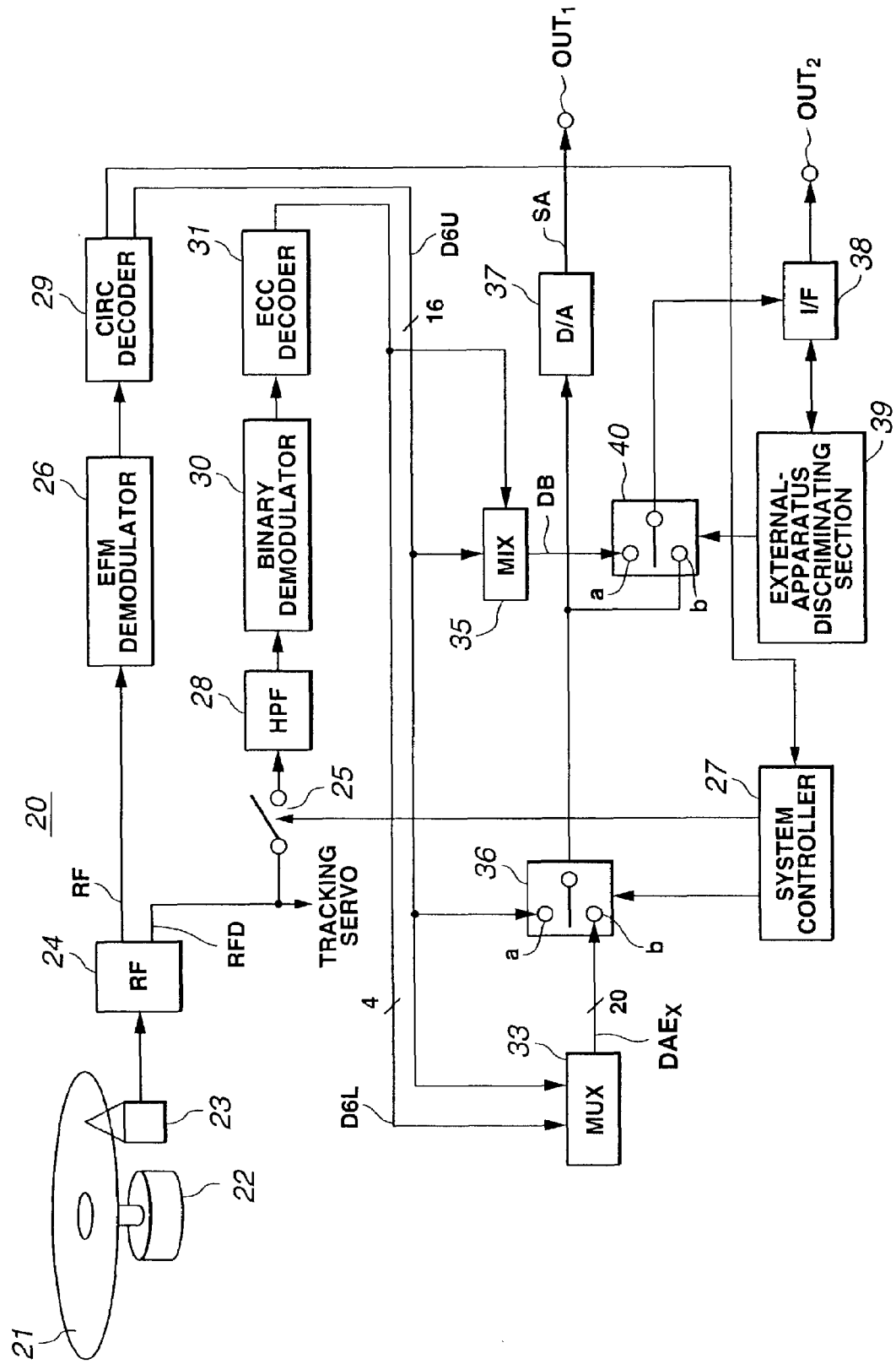
FIG. 4 is a block diagram showing an optical disc player.

FIG. 4 is a block diagram of an optical disc player 20, which is a data-reproducing apparatus according to the present invention. The optical disc player 20 of FIG. 4 can playback not only the ExCD disc but also the conventional optical discs. In the player 20, the spindle motor 22 rotates the optical disc 21 at a constant linear velocity.

An optical pickup 23 reads the first data and second data from the optical disc 21 and generates a signal. The signal is supplied to the RF circuit 24. The optical pickup 23 incorporates a semiconductor laser. The laser emits a laser beam, which is applied to the optical disc 21. The pickup 23 has light-receiving elements, which receive the light reflected from the optical disc 21. The RF circuit 24 amplifies the signal output from the optical pickup 23. The RF circuit 24 performs operations on the signal, reproducing a signal RF from the first data and generating a tracking error signal RFD associated with the second data.

Figure 5:
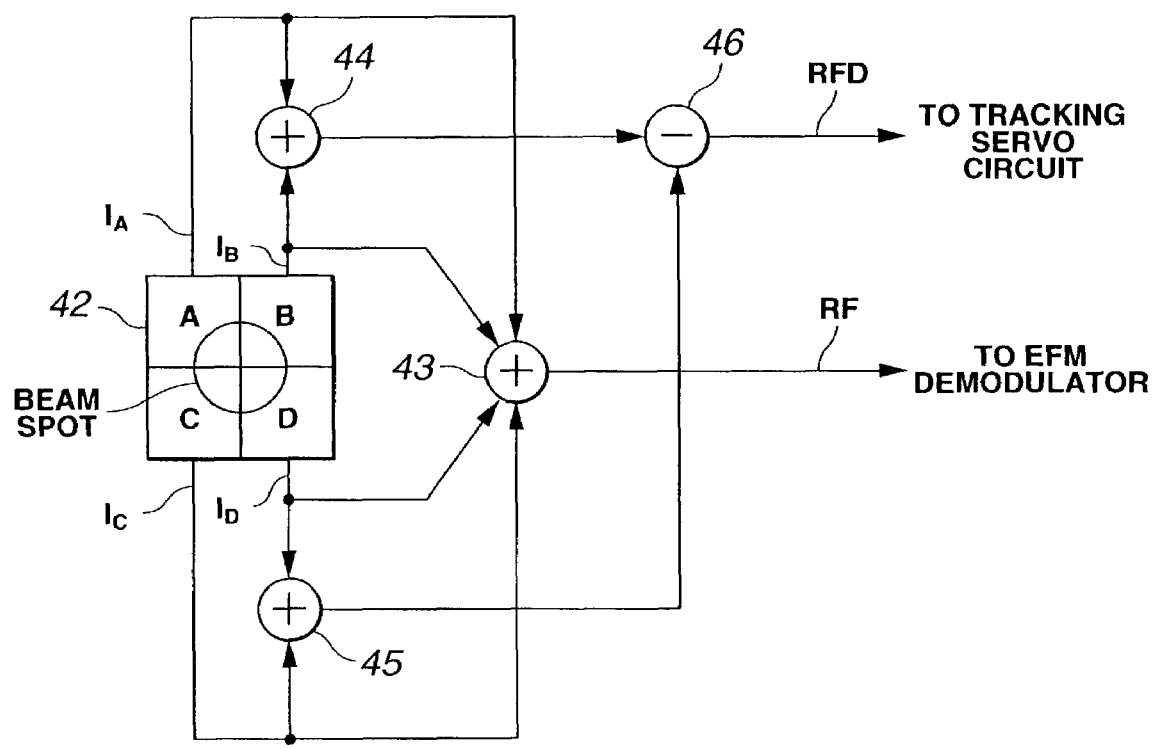
FIG. 5 is a diagram explaining the pickup incorporated in the optical disc player.

The optical pickup 23 and the RF circuit 24 are provided in the form of, for example, the circuit illustrated in FIG. 5. The circuit of FIG. 5 comprises a detector 42. The detector 42 has four light-receiving elements A to D that are arranged in two rows and two columns, the rows extending along the track and the columns extending at right angles to the track. The detection signals $I_A$ to $I_D$ output from the light-receiving elements A to D are supplied to the RF circuit 24. The operation circuits provided in the RF circuit 24 performs operations on the signals $I_A$ to $I_D$. More specifically, the adder circuit 43 finds the sum, $I_A+I_B+I_C+I_D$, whereby a signal RF is reproduced. Meanwhile, the adder circuit 44 and subtracter circuit 45 obtains the value, $\{(I_A+_B)-(I_C+I_D)\}$, whereby a tracking error signal RFD is generated. The signal RF reproduced has its level changed in accordance with the pits and lands of the optical disc 21. The tracking error signal RFD is used to achieve tracking servo control. In addition, its high-frequency component is extracted and used to determine the directions in which the pits made in the optical disc 21 are displaced.

Tracking errors can be detected by methods other than the configuration shown in FIG. 5. They can be detected by, for example, three-beam method that uses three beam spots, push-pull method that employs a two-element detector, or heterodyne method in which the difference between the outputs of a four-element detector, with respect to the diagonal of the detector, is sampled at the edge of the RF signal.

The tracking error signal RFD is supplied to the tracking servo circuit (not shown), which moves the beam spot to the centerline of the track provided on the optical disc 21. In the case of the ExCD disc, the pits are displaced from the centerline of the track. The level of the tracking error signal RFD therefore changes in accordance with how much the pits are displaced. The change in the level of the signal RFD results from the high-frequency component of the tracking error signal RFD, to which the tracking servo circuit hardly responds. The tracking servo circuit can compensate for the off-track due to the eccentricity the disc has when it is manufactured or positioned in the optical disc player 20. The tracking servo circuit can therefore correct the tracking error resulting from the signal component of a relatively low frequency. In the case of the ExCD disc, too, the spot of the reading laser beam moves along the centerline of the track. The pits can be scanned with the laser beam. This is because the pits are displaced from the centerline of the track, but by the distance of only ±0.05 [μm].

As shown in FIG. 4, the signal RF is supplied from the RF circuit 24 to the EFM (Eight to Fourteen) demodulator 26, too. The tracking error signal RFD is supplied to the binary demodulator 30 through the selection circuit 25 and the high-pass filter 28. The high-pass filter 28 extracts a high-frequency component from the tracking error signal RFD. The high-frequency component represents the displacement of pits. The selection circuit 25 outputs the tracking error signal RFD to the high-pass filter 28 under the control of the system controller 27 when the controller 27 determines that the optical disc 21 is an ExCD disc.

As indicated above, TOC data is recorded in an ExCD disc. The TOC data includes disc identification data ID, reproduction-mode identification data Im, and copy identification data IC. The copy identification data IC shows that the optical disc 21 is an original compact disc molded by the use of the mother disc. The CIRC (Cross Interleave Reed-Solomon Code) decoder 29 processes the signal RF immediately after the optical disc 21 is set in the optical disc player 20, reproducing the TOC data recorded in the read-in area 54 of the optical disc 21. The TOC data reproduced is supplied to the system controller 27. The system controller 27 determines from the disc identification data ID that the optical disc 21 is an ExCD disc. Upon determining this fact, the system controller 27 turns on the selection circuit 25. If the system controller 27 detects no disc identification data ID in the TOC data, it determines that the optical disc 21 is a conventional CD. In this case, the system controller 27 turns off the selection circuit 25.

The EFM demodulator 26 performs EFM demodulation on the signal RF output from the RF circuit 24. The CIRC decoder 29 de-scrambles the data output from the EFM demodulator 26 and corrects the errors in the data by using the error correction code added to the data when the data was recorded on the optical disc 21. The CIRC decoder 29 thus reproduces audio data D6U from the disc 21. No matter whether the disc 21 is an existing optical disc or an ExCD disc, audio data D6U of 16 bits/sample format is generated from the signal RF reproduced from the disc 21 in the same manner as in the existing optical disc player.

The system controller 27 may determine, from the disc identification data ID, that the optical disc 21 is an ExCD disc and may then turn on the selection circuit 25. If this in the case, the high-frequency component of the tracking error signal RFD is supplied to the binary demodulator 30. The binary demodulator 30 compares the high-frequency component of the signal RFD with a prescribed threshold value, thereby detecting a change in the level of the high-frequency component. The binary modulator 30 generates binary data that will improve the quality of sound to be reproduced.

The ECC decoder 31 receives the data output from the binary demodulator 30. The decoder 31 performs interleave process on this data, generating 4-bit data D6L that will improve the quality of sound to be reproduced.

As will be described later in detail, the ECC decoder 31 outputs 4-bit data (0000), instead of the data D6L, to cause the mixer 35 to perform exclusive-OR operation on audio data D6U if the external apparatus connected to the player 20 is not an authorized one (to which data can be copied or transferred). The ECC decoder 31 outputs 4-bit data items, or random numbers, one after another, so that the mixer 35 may multiplies the data D6U.

The multiplexer (MUX) 33 receives the 4-bit, parallel data D6L from the ECC decoder 31 and adds the data D6L to the lower part of the 16-bit, parallel audio data output from the CIRC decoder 29. Thus, the multiplexer 33 generates 20-bit, parallel audio data DAEx. The system controller 27 may detect the disc identification data ID included in the TOC data and the reproduction-mode identification data Im may designate the first data-reproducing mode. In this case, the multiplexer 33 outputs the high-quality data, i.e., the audio data DAEx of 20 bit/sample format, through the selection circuit 36 that has selected the terminal b. On the other hand, the system controller 27 may detect the disc identification data ID included in the TOC data, and the reproduction-mode identification data Im may designate the second data-reproducing mode so that audio signals of the same quality as those reproduced from ordinary CDs. If this is the case, the selection circuit 36 selects the terminal a and outputs the audio data D6U of the 16 bit/sample format, which has been supplied from the CIRC decoder 29.

When a conventional optical disc may be placed in the optical disc player 20, the system controller 27 detects no disc identification data ID and turns off the selection circuit 25. The tracking error signal RFD is not supplied to the HPF 28. Namely, if the system controller 27 detects no disc identification data ID, it turns off the selection circuit 25, which selects the terminal a. Thus, audio data of the 16 bit/sample format, which has the same quality as the audio data D6U, is output when an conventional optical disc is set in the optical disc player 20.

The mixer (MIX) 35 performs exclusive-OR operation on the 16-bit, parallel audio data D6U output from the CIRC decoder 29. To be more specific, the mixer 35 receives the quality-enhancing data D6L from the ECC decoder 31 and adds the bits of this data D6L to the four lowest bits of the 16-bit, parallel audio data D6U. Thus, the mixer 35 outputs audio data DB representing sound deteriorated in quality as compared to the sound represented by the audio data output from the CIRC decoder 31. If the ECC decoder 31 outputs random-number data, the mixer 35 will multiply the four lowest bits of the audio data by the random-number data, generating the audio data DB.

When the optical disc 21 is placed in the placed in the optical disc player 20, the system controller 27 makes the optical pickup 23 seek the TOC data recorded in the read-in area 54 of the optical disc 21. The optical pickup 23 reads from the disc 21 the information that includes the number of musical pieces recorded in the disc 21 and the operation time. This information is displayed by the display means that is provided on the player 20. At this time, the system controller acquires the disc identification data ID and the reproduction-mode identification data Im, both recorded in the optical disc 21. From the data ID and data Im the system controller determines whether the disc 21 is an ordinary optical disc or an ExCD disc. If the optical disc 21 is an ExCD disc, the system controller determines whether the reproduction-mode identification data Im designates the first data-reproducing mode or the second data-reproducing mode. In the first data-reproducing mode, audio data representing high-quality sound is reproduced from the ExCD disc. The second data-reproducing mode is similar to the mode of reproducing data from the ordinary CDs. The system controller 27 controls the selection circuit 25 and the selection circuits 36 in accordance with the data-reproducing mode designated by the reproduction-mode identification data Im.

The selection circuit 25 is turned on if the optical disc 21 is an ExCD disc, and the selection circuit 36 selects the terminal b if the data-reproducing mode is first mode, whereby the output of the multiplexer 33 is selected. As a result, the selection circuit 36 outputs audio data DAEx that represents high-quality sounds. On the other hand, the selection circuit 36 selects the terminal a if the optical disc 21 is a conventional compact disc and if the reproduction-mode identification data Im designates the mode of reproducing data from ordinary compact discs (i.e., the second mode). In this case, the selection circuit 36 outputs the audio data generated by the CIRC decoder 29, to the digital-to-analog (D/A) converter circuit 37.

The D/A converter circuit 37 receives the audio data (digital data) from the selection circuit 36 and convert it to an analog signal, or an audio signal SA. The audio signal SA is output from an output terminal OUT1. Thus, with the optical disc player 20 it is possible to process the audio data D6U output from the CIRC decoder 29, thereby to reproduce data that represents sound of such quality as is defined by 16 bits (i.e., CD sound quality) if the disc is a conventional optical disc. If the disc is an ExCD disc and the first reproducing mode is selected, the audio data DAEx output from the multiplexer 33 is selected, thereby to reproduce data that represents sound of such quality as is defined by 20 bits (i.e., ExCD sound quality). If the disc is an ExCD disc and the second reproducing mode is selected, the audio data D6U is processed, thereby to reproduce data that represents sound of CD sound quality defined 16 bits.

As shown in FIG. 4, the interface 38 functions as an input/output circuit that receives and transmits various data items from and to the external apparatus. It may transmit audio data to, for example, an audio recorder. It may transmit and receive data items about the audio data. The external-apparatus discriminating section 39 is connected to the interface 38. The section 39 receives data about the external apparatus and determines whether the external apparatus connected to the apparatus 20 is an authorized one (to which data can be copied or transferred).

The selection circuit 40 is controlled in accordance with the decision made by the external-apparatus discriminating section 39. If the external apparatus is found to be an authorized one, the section circuit 40 selects the terminal b. If so, the digital audio data is output from the selection circuit 36 to the external apparatus through the interface 38 land an output terminal OUT2. If the external apparatus is not an authorized one, the selection circuit 40 selects the terminal a. In this case, the low-quality digital audio data is supplied from the mixer 35 to the external apparatus. The copyright to the musical piece is therefore protected.

From the copy identification data IC recorded as the TOC data about the ExCD disc, the disc-discriminating section 27 may determine that the data is not original, copied from the Ex disc. If this is the case, the selection circuits 25 and 36 are controlled, thereby outputting data of the 16 bits/sample format, which is the same as data reproduced from ordinary optical discs.

The apparatus 20 may be configured to reproduce data recorded as displacement of pits and may be output the same independently of the data reproduced from optical discs.

The data-recording apparatus 1 records data in the form of pits displaced to the left and right from the centerline of the track in accordance with the logic values ("0" and "1") of the bits constituting the displacement control data D4, as has been explained with reference to FIGS. 3A to 3D. Namely, the 16-bit audio data recorded in the form of pits and lands alternately arranged is the first data, and the displacement control data D4 (the four lower bits) is the second data. Any bit of the second data is represented by the displacement of a pit.

Figure 6:
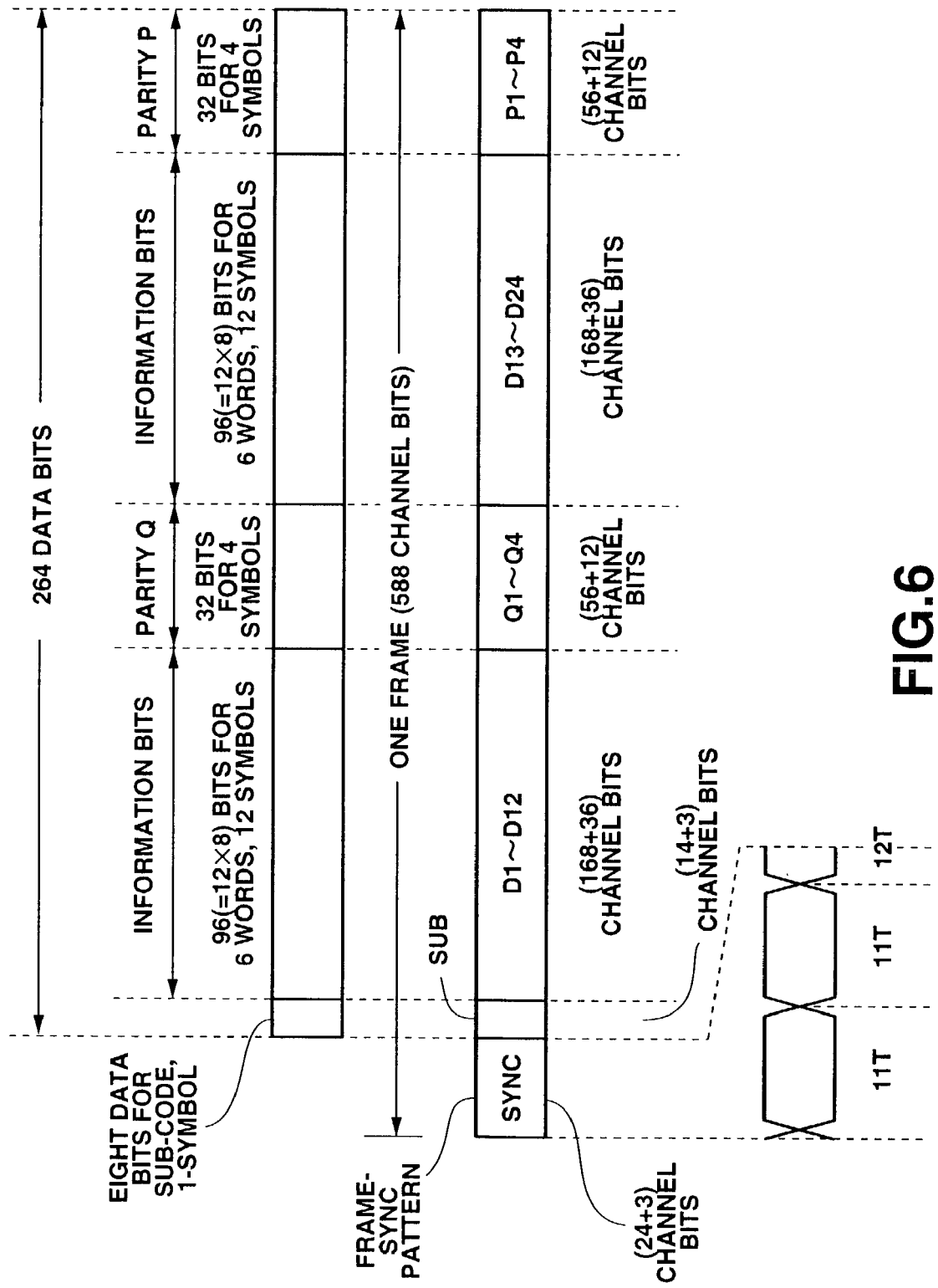
FIG. 6 is a diagram illustrating the data configuration recorded in the optical disc.

It will be described how data is recorded in the form of pits displaced from the centerline of the track, in the way different from the data-recording mode used in the conventional data-recording apparatus. FIG. 6 illustrates the data format of a compact disc. The parities Q and P of four symbols are formed of 12 samples (24 symbols) of two channels of digital audio data. One symbol for a sub-code is added to 32 symbols, making one block composed of 33 symbols (264 data bits). In other words, one EFM-modulated frame contains 33 symbols, i.e., one sub-code, 24 data items D1 to D24, parties Q1 to Q4 and parities P1 to P4.

In the EFM modulation, each symbol (8 data bits) is converted to 14 channel bits. Three connecting bits are provided between any two data blocks, each consisting of 14 channel bits. Moreover, a frame sync pattern is added to the head of each frame. The frame sync pattern is a continuous one composed of 11T, 11T and 12T that recur in the order mentioned, where T is the period of the channel bit. The pattern would not occur in the EFM modulation rules. This special pattern makes it possible to detect the frame sync.

In the EFM modulation, "0s" or "1s" need to continue for a period of 3T to 11T, each being an integral multiple of T. This is because, the clock signal will hardly be reproduced in the process of reproducing data if the "0s" or "1s" continue for too long a period. Not only in the EFM modulation, but also another digital modulation such as 8-to-16 modulation that modulates 8-bit data to a 16-channel bit pattern, "0s" or "1s" must continue for such a period in order to achieve the same object. In other words, the digital modulation is a process of convert data so that the minimum data-inversion period may be as long as possible and the maximum data-inversion period may be as short as possible. The amount of data that can be recorded on average therefore depends on the type of the digital modulation employed, if the second data is recorded in the form of displacement of pits. In the EFM modulation, for example, thee bits, on average, are added to the head and end of 2-byte data (34T including connecting bits). Hence, three bits can be recorded for any 2-byte data to record the second data in the form of binary data. If three-value recording that will be described later is employed, 4.5 bits can be recorded.

As pointed out above, the maximum data-inversion period (maximum pit length) is 11T. This can prevent, to some extent, the spot of the reading beam from deviating from the centerline of the track. However, the beam spot may move from the track in one direction, depending upon the bit pattern of the second data. The tracking may have offset during the data-reproducing process. To avoid this problem, some pits are arranged in the centerline of the track within one frame.

Figure 7:
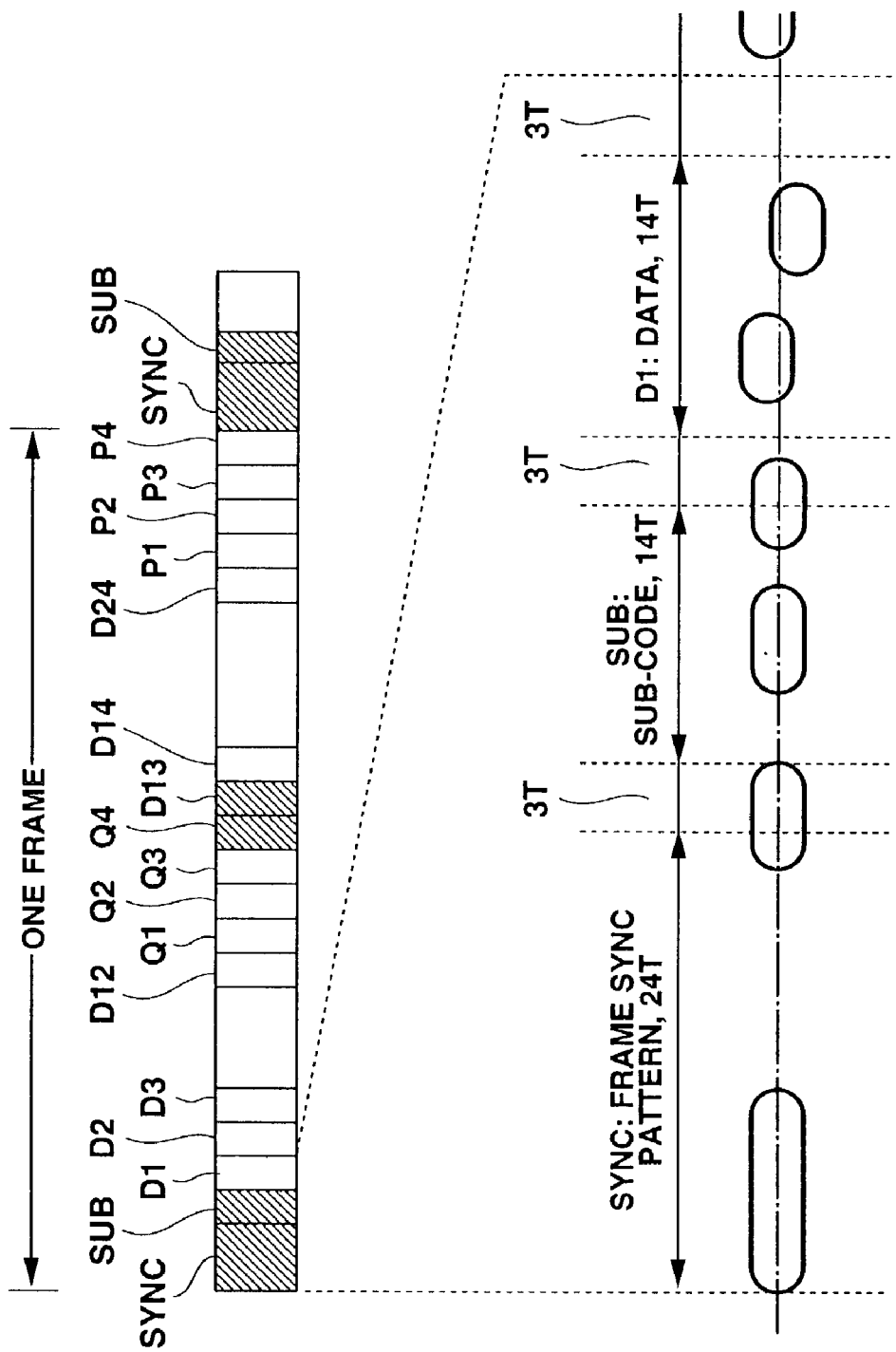
FIG. 7 is a diagram showing an example of bit displacement.

FIG. 7 shows an example of bit displacement. In this example, the frame has a head area (a shaded area consisting of a frame sync pattern and a sub-code) and an intermediate area (a shaded area consisting of data Q4 and data D13). The pits arranged in the head area and the intermediate area are made in the centerline of the track. These pits made in the centerline of the track prevent the tracking from having an offset in the course of reproducing data. Alternatively, the pits arranged in only the head area or the intermediate area may be positioned in the centerline of the track. Moreover, only one pit may be arranged in the centerline of the track.

The tracking can be effectively prevented from having an offset if the second data is not directly recorded, but modulated before it is recorded. The data may be modulated by 8-to-9 conversion, 8-to-10 conversion, or the like. In the 8-to-9 conversion, 8-bit data is converted to 9-bit data. In the 8-10 conversion, 8-bit data is converted to 10-bit data. Once the data is so modulated, it may be no longer necessary to arrange pits in the centerline of the track.

Figures 8A, 8B:
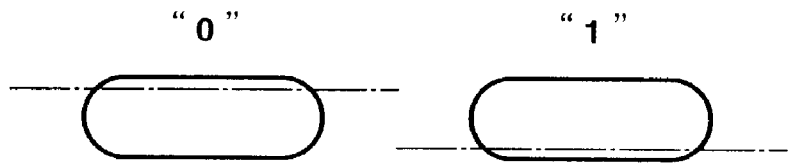
FIGS. 8A and 8B are diagrams illustrating an example of the process of modulating the second data, which can be utilized in the present invention.

FIGS. 8A and 8B illustrate an example of 4-to-5 modulation. As FIG. 8A shows, a pit displaced from the centerline of the track in one direction represents "0," while a pit displaced from the centerline in the other direction represents "1." The four bits forming a code word (code symbol) are converted to five bits that define a code word (code symbol), in accordance with the conversion-rule table shown in FIG. 8B. Each code word contains two bits "0" bits (or two "1" bits) and three "1" bits (or three "0" bits). In each code word, four or more "0" or "1" bits do not continue.

In the 4-to-5 conversion shown in FIG. 8B, two or less "0" or "1" bits form an end of each code word, and four or less "0" or "1" bits continue at the junction between two code words. If the second data is subjected to the 4-to-5 conversion, the tracking is prevented from having an offset. The 4-to-5 conversion shown in FIG. 8B generates a bit pattern that functions an odd parity once the five bits of the code word are subjected to an exclusive-OR operation. In view of this, the 4-to-5 conversion is regarded as capable of detecting errors.

Figure 9:
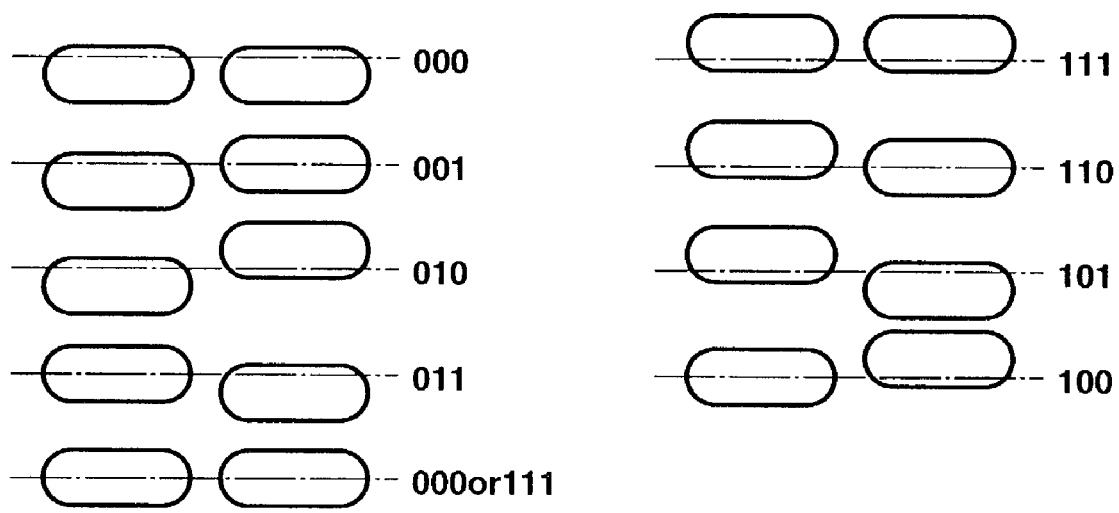
FIG. 9 is a diagram explaining the process of recording multi-value data, which can be employed in the present invention.

With reference to FIG. 9 it will be explained how multi-value data is recorded by making non-displacement pits (i.e., bits on the centerline of the track), as well as pits displaced to the left and right with respect to the direction of recording (reproducing) data. Three bits of the second data are allocated to represent the displacement of two pits (not necessarily have the same length). Assume the data has been recorded from the left to the right in the drawing. Then, three bits "010" are assigned to two pits displaced to the left from the centerline of the track and also to two pits displaced to the right from the centerline of the track.

The two lowermost pits that are on the centerline of the track are special ones that are not usually used. Three bits "000" or "111" are allocated to these two pits. These pits are used in place of two pits (both displaced to the right) that are usually allocated to "000" or in place of two pits (both displaced to the left) that are usually allocated to "111." If three bits "000" or "111" continue in the second data, the tracking will have an offset. In this case, the two special pits are utilized. Whether the two special pits represent "000" or "111" is determined by the three bits represented by the two pits, one preceding the special pits and the other following the special pits. As shown in FIGS. 8A and 8B, the second data can be recorded in an increased amount, while the first data is recorded in a fixed amount, by virtue of the recording of multi-value data.

The types of the second data to be recorded in the form of pits displaced, and some other things, will be described. In the example described above, the second data corresponds to the lower four bits. Thus, the sound will be improved in quality if the number of bits for one sample of audio data is increased to 20 bits. Another example of the second data that may improve the quality of sound is audio data that is configured for multi-channel recording. This second data pertains to a plurality of channels, while the data recorded on a compact disc pertains to two channels only. The second data of this example can include, for example, the low-band component recorded on the centerline and the data of rear left- and right-channel data. In this case, the audio data may be compressed before by MP-3 (MPEG1 audio layer 3) method or a similar method before it is recorded, because the second data can be recorded but in a small amount. Data identical to the first data may be recorded as the second data, by employing an appropriate data-compressing method, and the second data reproduced by the data-reproducing apparatus may be recorded in another recording medium such as a memory card.

It will be described how audio data is subjected to multi-channel recording as the first data and the second data. More precisely, it will be explained bow multi-channel audio data or the like is recorded to accomplish the reproduction of surrounding sound.

The multi-channel audio data consists of a front-left channel data item, a front-right channel data item, a rear-left channel data item and a rear-right channel data item. The four channel data items are input to a front-left loudspeaker 61, a front-right loudspeaker 62, a left-rear loudspeaker 63 and a right-rear loudspeaker 64, respectively, as is illustrated in FIG. 10. The loudspeakers 61 and 62 are arranged at the front of an acoustic space.

The front-left channel data item and the front-right channel data item are recorded as the first data. The rear-left channel data item and the rear-right channel data item are recorded as the second data.

As shown in FIG. 11A, the front-left channel data item $L_f$ and the front-right channel data item $R_f$ are quantized, each in the form of 16-bit data. As shown in FIG. 11B, the rear-left channel data item $L_B$ and the rear-right channel data item $R_B$ are quantized, each in the form of 16-bit data.

How the data-recording apparatus 1 manufactures an optical disc, utilizing the first data shown in FIG. 11A and the second data shown in FIG. 11B, will be explained below.

First, the A/D converter circuit 10 receives the audio signal Sa from the input terminal $IN_M$ and converts the signal SA to n-bit parallel audio data DA, at a prescribed sampling frequency fs [kHz].

The bit-processing section 11 decomposes the n-bit audio data DA into a front-left channel data item $L_f$, a front-right channel data item $R_f$, rear-left channel data item $L_B$ and the rear-right channel data item $R_B$, each being 16-bit data. The channel data items $L_f$ and $R_f$ are recorded as the first data. The channel data items $L_B$ and $R_B$ are recorded as the second data.

The data-processing circuit 12 receives the TOC data from the input terminal $IN_S$ and processes the same in the format defined for the optical disc. The TOC data is data to be recorded in the read-in area 54 of the optical disc. The data-processing circuit 12 generates channel data that corresponds to a train of pits. To the TOC data there is allocated reproduction-mode identification data Im that represents a data-reproducing mode, in which the first data and the second data will be reproduced from the recording area 53 of the optical disc 21. As described above, the first data consists of the front-left channel data item $L_f$ and the front-right channel data item $R_f$, each being 16-bit data, while the second data consists of rear-left channel data item $L_B$ and the rear-right channel data item $R_B$, each being 16-bit. A composite data item representing high-quality sound can therefore be reproduced from the optical disc. In this case, the reproduction-mode identification data Im may represent one of two alternative data-reproducing modes. In the first mode, the data-reproducing section incorporated in the data-reproducing apparatus 1 combines the first data and the second data, generating composite data. In the second mode, the data-reproducing section reproduces the first data and the second data independently.

The TOC data contains not only the reproduction-mode identification data Im, but also disc identification data ID and copy identification data IC. The disc identification data ID indicates that the data that improves the quality of sounds. The copy identification data IC shows that the optical disc is an original compact disc molded by the use of the mother disc. Therefore, the apparatus for reproducing data from the optical disc 21 can reproduce the audio data DA from the optical disc if the disc identification data ID and the reproduction-mode identification data Im are detected. It should be recalled that the audio data DA has been decomposed into a front-left channel data item $L_f$, a front-right channel data item $R_f$, rear-left channel data item $L_B$ and the rear-right channel data item $R_B$, each being 16-bit. From the copy identification data IC the data-reproducing apparatus can determine whether the disc is an original compact disc or a copied compact disc.

The data-processing circuit 12 receives, from the bit-processing section 11, the front-left channel data item $L_f$ and the front-right channel data item $R_f$, each being 16-bit audio data. The circuit 12 processes the channel data items $L_f$ and $R_f$ in the format defined for, for example, a compact disc, thereby generating channel data D3 that corresponds to a train of pits.

Further, the data-processing circuit 12 receives, from the bit-processing section 11, the rear-left channel data item $L_B$ and the rear-right channel data item $R_B$, each being 16-bit audio data. The circuit 12 processes the channel data items $L_B$ and $R_B$, thereby generating channel data D4 that represents the displacement of pits.

The drive circuit 13 receives the channel data D3 from the data-processing circuit 12 and generates a drive signal S3. The drive signal S3 shields a laser beam or allows the passage thereof, in accordance with the logic level of the channel data D3. Hence, the audio data DA, i.e., front-left channel data item $L_f$ and the front-right channel data item $R_f$, each being 16-bit audio data, is recorded in the original disc 2. Ordinary compact disc players can therefore reproduce the data DA.

The drive circuit 7 generates a drive signal S4 so that pits may be made in the surface of the disc, each displaced to the left and right from the centerline of the track, in accordance with the displacement control data D4. The pits corresponding to the audio data (i.e., front-left channel data item $L_f$ and the front-right channel data item $R_f$, each being 16-bit audio data) are thereby made in the optical disc 21, each displaced in accordance with the control data D4. The displacement control data D4 corresponds to the rear-left channel data item $L_B$ and the rear-right channel data item $R_B$, each being 16-bit audio data. Thus, the data-recording apparatus 1 records the rear-left channel data item $L_B$ and the rear-right channel data item $R_B$, each being 16-bit audio data, in the form of pits, each displaced to the left or right from the centerline of the track and thus representing logic value "0" or "1."

The first data and the second data are thereby recorded on an ExCD disc, respectively as front-left channel data item $L_f$ and the front-right channel data item $R_f$, each being 16-bit audio data, and rear-left channel data item $L_B$ and the rear-right channel data item $R_B$, each being 16-bit audio data. The optical disc player 20 shown in FIG. 4 can reproduce data from the ExCD disc.

The essential operation performed in the optical disc player 20 will be described. The system controller 27 may determine, from the disc identification data ID, that the optical disc 21 is an ExCD disc. In this case, the system controller 27 turns on the selection circuit 25. The high-frequency component of the tracking error signal RFD is supplied to the binary demodulator 30. The binary demodulator 30 compares the high-frequency component of the signal RFD with the prescribed threshold value, detecting a change in the level of the high-frequency component. The binary modulator 30 generates binary audio data, more precisely, the rear-left channel data item $L_B$ and the rear-right channel data item $R_B$, each being 16-bit audio data.

The ECC decoder 31 receives the data output from the binary demodulator 30 and corrects errors in the data. Further, the decoder 31 performs interleave process on this data, reproducing the rear-left channel data item $L_B$ and the rear-right channel data item $R_B$, each being 16-bit audio data.

The multiplexer (MUX) 33 combines the first data output from the CIRC decoder 29, i.e., front-left channel data item $L_f$ and the front-right channel data item $R_f$, each being 16-bit audio data, with the second data, i.e., rear-left channel data item $L_B$ and the rear-right channel data item $R_B$, each being 16-bit audio data. The multiplexer 33 therefore generates 64-bit multi-channel audio data DAEx. The system controller 27 may detect the disc identification data ID in the TOC data, and the reproduction-mode identification data Im may represent the first data-reproducing mode. If this is the case, the multiplexer 33 outputs the 64-bit multi-channel audio data DAEx through the selection circuit 36 that has selected the terminal b. On the other hand, the system controller 27 may detect the disc identification data ID in the TOC data, and the reproduction-mode identification data Im may designate the second data-reproducing mode for reproducing audio signals that representing sounds of the same quality as can be reproduced from ordinary CDs. In this case, the selection circuit 36 selects the terminal a, whereby the multiplexer 33 outputs the front-left channel data item $L_f$ and the front-right channel data item $R_f$, each being 16-bit audio data, which have been output from the CIRC decoder 29.

The first data and the second data may be first information and second information, respectively, which are two units of information to be recorded in association with each other.

Figure 12:
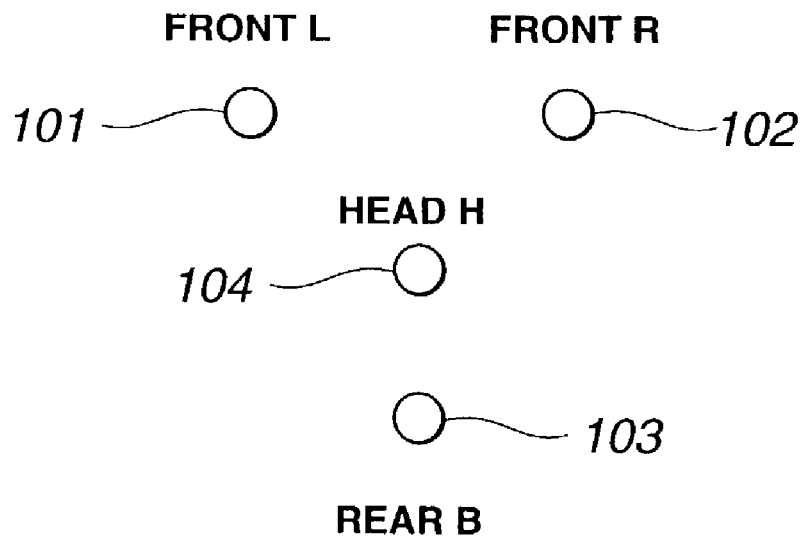
FIG. 12 is a diagram illustrating another positional relation of the loudspeakers that receive the data signals reproduced from the optical disc of the invention.
Figures 13A, 13B:
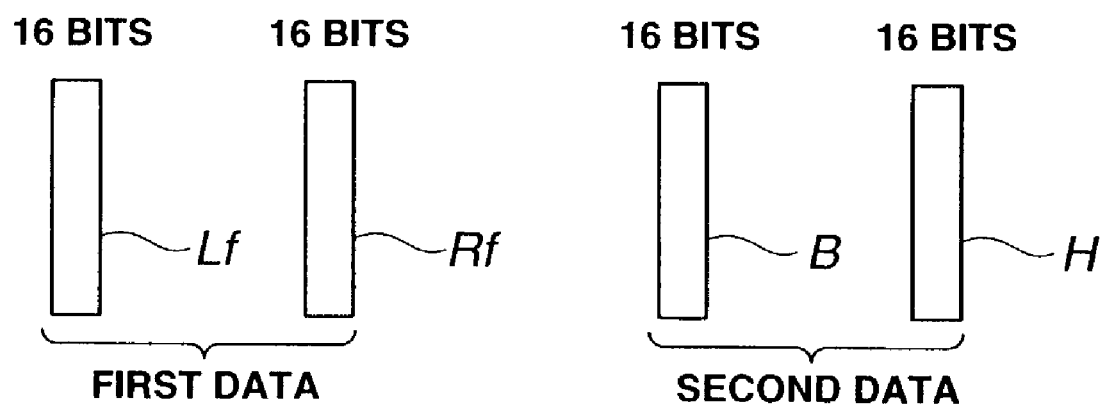
FIGS. 13A and 13B are schematic diagrams representing the first data and the second data, both recorded in the optical disc in order to reproduce the information that represents the positions of the loudspeakers shown in FIG. 12.

For example, the audio data recorded in the optical disc 21 may be multi-channel data illustrated in FIG. 12. The multi-channel data consists of a front-left channel data item $L_f$, a front-right channel data item $R_f$, a rear channel data item B and an upper channel data item H. The four channel data items are input to a front-left loudspeaker 101, a front-right loudspeaker 102, a rear loudspeaker 103 and an upper loudspeaker 104, respectively. As FIG. 12 shows, the front-left loudspeaker 101 and the front-right loudspeaker 102 are arranged at the front of an acoustic space. The rear loudspeaker 103 is located at the back of the acoustic space. The upper loudspeaker 104 is positioned above the listener. In this case, the front-channel data items $L_f$ and $R_f$ are recorded as the first data, and the rear-channel data B and the upper-channel data H are recorded as the second data, as is illustrated in FIGS. 13A and 13B.

Since the multi-channel audio data is recorded in the form of the first data and the second data, only the first data may be reproduced to accomplish stereophonic playback utilizing the front-left loudspeaker 101 and the front-right loudspeaker 102. Alternatively, the first information and the second information, which are recorded as the first data and the second data, may be combined to achieve multi-stereophonic playback using the rear loudspeaker 103 and the upper loudspeaker 104, as well as the front-left loudspeaker 101 and the front-right loudspeaker 102.

Figure 14:
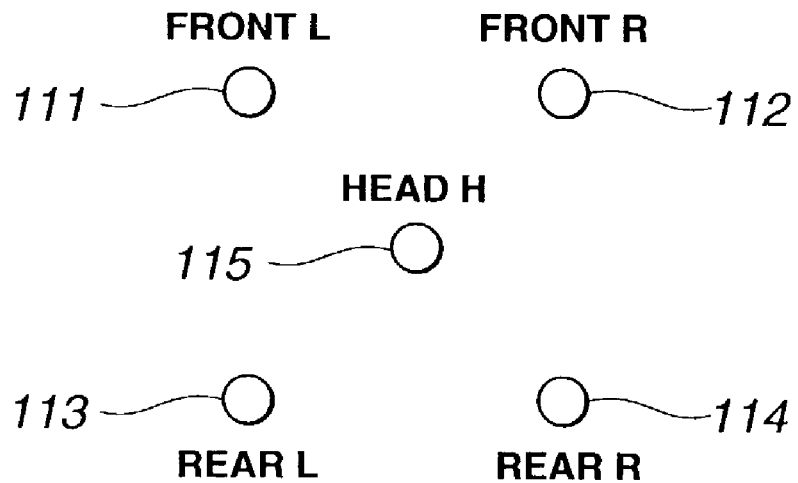
FIG. 14 is a diagram showing a further positional relation of the loudspeakers that receive the data signals reproduced from the optical disc of the invention.
Figure 15A:
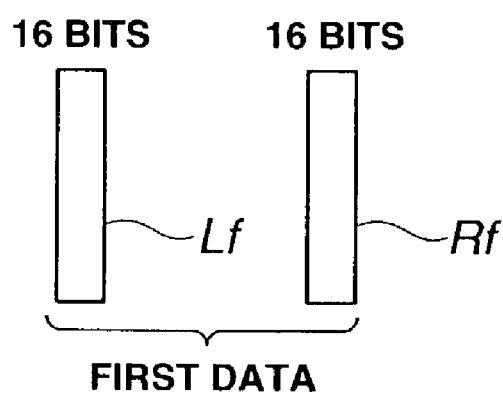
FIGS. 15A and 15B are schematic diagrams representing the first data and the second data, both recorded in the optical disc in order to reproduce the information that represents the positions of the loudspeakers shown in FIG. 14.
Figure 15B:
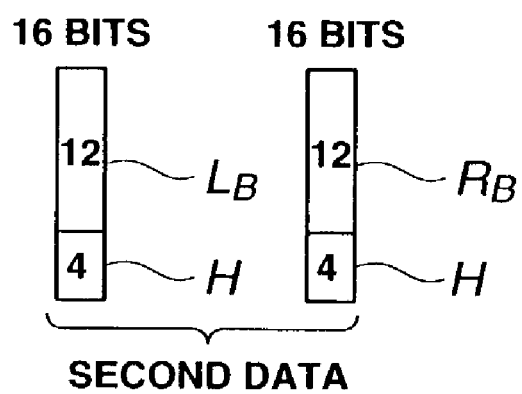

The audio data recorded in the optical disc 21 may be multi-channel data illustrated in FIG. 14. This multi-channel data consists of a front-left channel data item $L_f$, a front-right channel data item $R_f$, a rear-left channel data item $L_B$ and the rear-right channel data item $R_B$, and an upper-channel data item H. The five channel data items are input to a front-left loudspeaker 111, a front-right loudspeaker 112, a rear-left loudspeaker 113, a rear-right loudspeaker 114, and an upper loudspeaker 115, respectively. As shown in FIG. 14, the front-left loudspeaker 111 and the front-right loudspeaker 112 are arranged at the front of an acoustic space. The rear-left loudspeaker 113 and the rear-right loudspeaker 114 are located at the back of the acoustic space. The upper loudspeaker 115 is positioned above the listener. In this case, the front-channel data items $L_f$ and $R_f$ are recorded as the first data, and the rear-left channel data item $L_B$ and the rear-right channel data item $R_B$, and an upper-channel data item H are recorded as the second data, as is illustrated in FIGS. 15A and 15B. Of the bits of each item in the second data, i.e., 16-bit quantized data, the upper 12 bits are used as the rear-left channel data item $L_B$ and the rear-right channel data item $R_B$. The lower four bits of each item in the second data are used as the upper channel data item H.

Figure 16A:
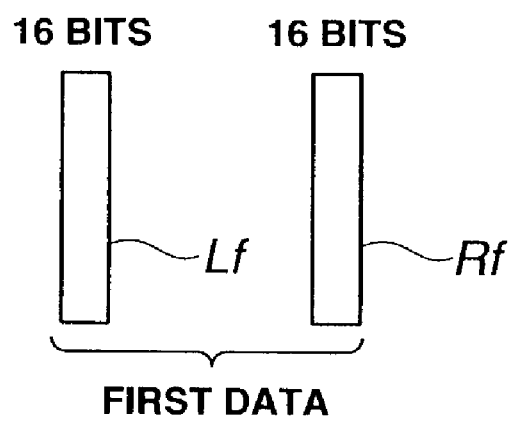
FIGS. 16A and 16B are other schematic diagrams representing the first data and the second data, both recorded in the optical disc in order to reproduce the information that represents the positions of the loudspeakers shown in FIG. 14.
Figure 16B:
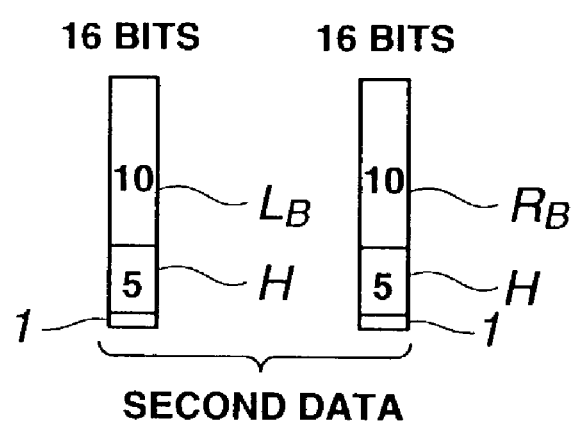

As shown in FIGS. 16A and 16B, the 16-bit front channel data items $L_f$ and $R_f$ may be recorded as the first data. Of the bits of each data item in the second data, i.e., 16-bit quantized data, the upper ten bits may be used as the rear channel data items $L_B$ and $R_B$, the middle five bits may be used as intermediate-band audio signal data, and the lowest bit may be used as low-band audio signal data.

Alternatively, of the bits constituting audio data, such as 16-bit quantized data or 32-bit quantized data, the odd-numbered samples may be recorded as the first data, and the even-numbered samples may be recorded as the second data.

Moreover, the first data and the second data can be recorded in the optical disc 21 in other various formats.

If the first data is audio information, the second data is text data or image data that is associated with the audio information. Alternatively, the first data may be image data. In this case, the second data represents a subtitle or a narration about the image data.

The first data may be audio information that represents a musical piece composed of a song and the accompaniment. In this case, the second data is audio information that represents an accompaniment that is different from the accompaniment to that song.

The first data and the second data can be recorded in various forms of audio information. For example, the first data may be recorded as audio information representing an accompaniment that differs from the accompaniment which composes, along with a song, a musical piece, and the second data may be recorded as audio information representing that song.

In the case of an orchestral music played by use of various instruments, the first data may be the first audio information that represents the music played with the instruments, except the piano, and the second data may be the second audio information that represents the music played with the piano.

Audio information may be recorded, partly as the first data and partly as the second data. If this is the case, a long musical piece can be recorded in the optical disc. To playback the optical disc, the first data and the second data are alternately reproduced, reproducing the long musical piece.

A data-recording apparatus that can record the front-left channel data item $L_f$, front-right channel data item $R_f$, rear-left channel data item $L_B$ and rear-right channel data item $R_B$ (in FIG. 11), as a multi-channel audio signal, on the optical disc 21 will be described with reference to FIG. 17.

Figure 17:
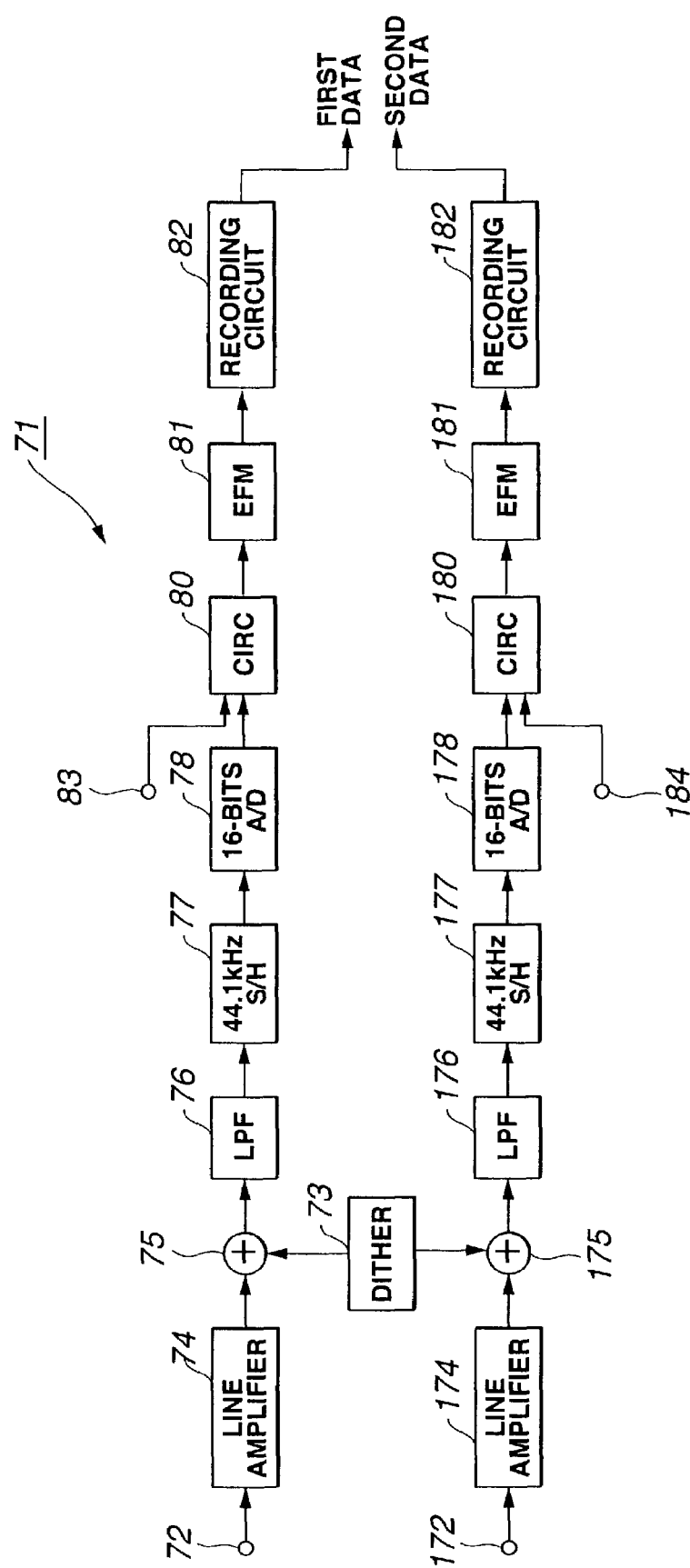
FIG. 17 is a block diagram illustrating another data-recording apparatus for recording multi-channel data in the optical disc.

As FIG. 17 shows, the data-recording apparatus 71 comprises a first input terminal 72 and a second input terminal 172. The first input terminal 72 receives a first audio signal that corresponds to the first information to be recorded as the first data in the optical disc 21. The second input terminal 172 receives a second audio signal that corresponds to the second information to be recorded as the second data in the optical disc 21.

The first audio signal and the second audio signal supplied to the first and second input terminals 72 and 172, respectively, are audio signals that will be combined to generate a multi-channel audio signal as has been explained with reference to FIGS. 10 and 11. The multi-channel audio data will be used to reproduce surrounding sound. Thus, the four channel data items, i.e., two front-channel data items and two rear-channel data items, which compose audio data and which have been generated by means of sampling at 44.1 KHz and 16-bit quantization, will be reproduced at the same time.

The first input terminal 72 receives the first audio signal that corresponds to the front-left and front-right channel data items. The second input terminal 172 receives the second audio signal that corresponds to the rear-left and rear-right channel data items.

The first audio signal supplied to the fist input terminal 72 is amplified by a first line amplifier 74 and supplied to a first adder 75. The first adder 75 receives dither, i.e., small noise, from a dither-generating circuit 73 and adds the same to the first audio signal. The first audio signal to which the dither has been added at the first adder 75 is supplied to a first LPF 76. The first LPF 76 extracts a signal having a frequency of 20 KHz or less, from the first audio signal. A first sampling circuit 77 performs sampling on the output of the first LPF 76, at a sampling frequency of 44.1 KHz. The data thus sampled is input to the first A/D converter 78. The first A/D converter 78 converts the data to 16-bit digital data.

Similarly, the first audio signal supplied to the second input terminal 172 is amplified by a second line amplifier 174 and supplied to a second adder 175. The second adder 175 receives the dither from the dither-generating circuit 73 and adds the same to the second audio signal. The second audio signal to which the dither has been added is supplied to a second LPF 176. The second LPF 176 extracts a signal having a frequency of 20 KHz or less, from the second audio signal. The second sampling circuit 177 performs sampling on the output of the second LPF 176, at a sampling frequency of 44.1 KHz. The data thus sampled is input to a second A/D converter 178. The second A/D converter 178 converts the data to 16-bit digital data.

The first digital data, i.e., the 16-bit data generated by converting the first audio signal in the first A/D converter 78, is temporarily stored in the first buffer memory, read therefrom and supplied to a first error-correction encoding circuit 80. A first error-correcting encoding circuit 80 performs cross-interleave and the fourth-degree Reed-Solomon encoding on the digital data by using a CIRC algorithm. The digital data encoded by the first error-correcting encoding circuit 80 is subjected to EFM modulation in the first modulation circuit 81. Thereafter, a first recording circuit 82 processes the digital data. The digital data thus processed is recorded as the first data in the optical disc 21, by means of the optical pickup. The optical pickup moves in the radial direction of the optical disc 21 while the optical disc 21 is rotating as is illustrated in FIG. 2. Thus, the data-recording apparatus 71 moves the spot of a laser beam L toward the outer circumference of the optical disc 21, forming a spiral track on the optical disc 21.

In the meantime, the second digital data, i.e., the 16-bit data generated by converting the second audio signal in the second A/D converter 178, is temporarily stored in the second buffer memory, read therefrom and supplied to the second error-correction encoding circuit 180. The second error-correcting encoding circuit 180 performs cross-interleave and the fourth-degree Reed-Solomon encoding on the digital data by using the CIRC algorithm. The digital data encoded by the second error-correcting encoding circuit 180 is subjected to EFM modulation in the second modulation circuit 181. Thereafter, the second recording circuit 182 processes the digital data. The digital data thus processed is recorded as the second data in the optical disc 21, by means of the optical pickup. More specifically, the second data is recorded in the form of the displacement of the pits that are made along the track and represent the first data, with respect to the centerline of the track.

The first digital data and the second digital data are recorded as the first data and the second data, respectively, in synchronism with each other.

The front-left channel data item and the front-right channel data item generated from the first audio signal may be recorded as the second data, whereas the rear-left channel data item and the rear-right channel data item generated from the second audio signal may be recorded as the first data.

In the data-recording apparatus 71, the first error-correcting encoding circuit 80 may have a first digital signal input terminal 83, and the second error-correcting encoding circuit 180 may have a second digital signal input terminal 183. If so, the first information and the second information, which will be recorded as the first data and the second data, respectively, are input directly to the first error-correcting encoding circuit 80 and the second error-correcting encoding circuit 180.

Furthermore, the first data and the second data, which will be recorded as associated data items by the data-recording apparatus 71, may be a combination of two audio information items. One of the audio information items represents a song and an accompaniment different from the accompaniment to the song, and the other of these audio information items represents a song and the accompaniment to this song.

The data-recording apparatus 71 records reproduction-mode identification data Im in the read-in area 54 of the optical disc 21 after it has recorded the first information and the second information as the first data and the second data, respectively. The mode data Im designates a data-reproducing mode.

Figure 18:
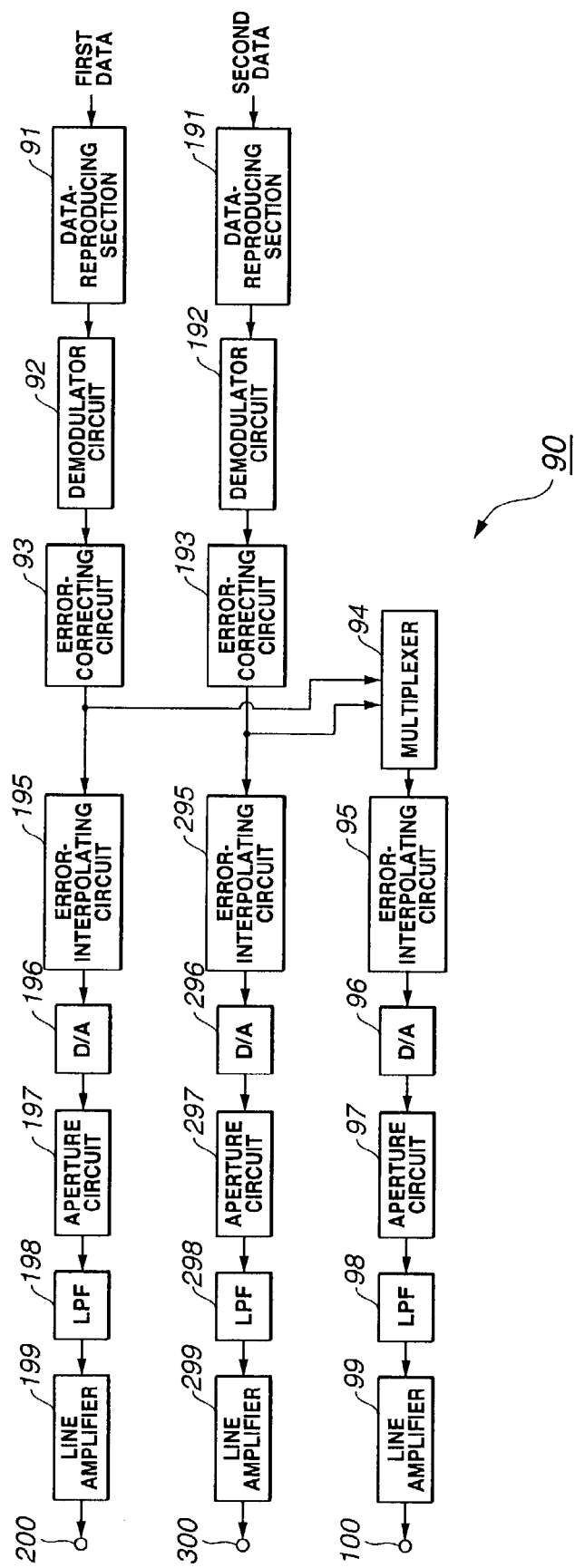
FIG. 18 is a block diagram depicting a data-reproducing apparatus that reproduces the multi-channel data from the optical disc.

The optical disc 21, in which the first data and the second data are recorded in association with each other as described above, is played back by such a data-reproducing apparatus 90 as is illustrated in FIG. 18.

The data-reproducing apparatus 90 has an optical pickup that incorporates an objective lens. The objective lens focuses a reproducing laser beam on the recording area 53 of the optical disc, in which the first data or the second data is recorded. The light beam reflected from the recording area 53 is detected as the first data or the second data, thus reproducing the first information or the second information from the optical disc.

In the data-reproducing apparatus 90, the optical pickup reads a signal from the first data while the disc-rotating mechanism (not shown) is rotating the optical disc. The signal thus read is supplied to a first data-reproducing section 91, first demodulator circuit 92 and second error-correcting circuit 93. The first data-reproducing section 91 performs RF process on the signal, generating an RF signal. The RF signal is supplied to the first demodulator circuit 92. The demodulator circuit 92 effects EFM demodulation on the RF signal, outputting an EFM-demodulated signal to the first error-correcting circuit 93.

Meanwhile, a tracking error signal is generated from the signal obtained by the optical pickup from the first data recorded in the optical disc 21. The high-frequency component of the tracking error signal is supplied to the second data-reproducing section 191, second demodulator circuit 192 and second error-correcting circuit 193. The second data-reproducing section 191 performs a prescribed process on the high-frequency component of the tracking error signal and detects the displacement of pits. The data indicative of the displacement of pits is supplied to the second demodulator circuit 192. The second demodulator circuit 192 modulates the data, generating data that represents the displacement of pits. This data is supplied to the second error-correcting circuit 193.

The data-reproducing apparatus 90 has a reproduction-mode selection button. The reproduction-mode selection button is depressed to select the first information and the second information, which have been recorded in the optical disc 21, respectively as the first data and as the second data.

The first error-correcting circuit 93 and the second error-correcting circuit 193 generate data items in accordance with the reproduction mode selected. The reproduction-mode selection button may be pushed, selecting the first data-reproducing mode designated by the reproduction-mode identification data Im recorded in the optical disc 21, in order to reproduce a signal by processing the first data and the second data. In this case, the first information and the second information, which have been read from the first data and the second data, respectively, are supplied to multiplexer 94. The multiplexer 94 performs an operation in accordance with the reproduction mode selected signal stored in the disc 21 on the first information and the second information, that is, either adding them or subtracting one information of the other, thereby reproducing a signal.

More precisely, the multiplexer 94 adds the first data and the second data, generating a sum signal, if the front-left channel data item and the front-right channel data item are recorded as the first data and if the rear-left channel data item and the rear-right channel data item are recorded as the second data.

The audio data subjected to the operation in the multiplexer 94 is supplied to a first error-interpolating circuit 95. The circuit 95 decodes the audio data by using a CIRC algorithm and supplies the data to the first D/A converter 96. The first D/A converter 96 converts the data to an analog audio signal. The analog audio signal is supplied to a first aperture circuit 97 and thence to a first low-pass filter (LPF) 98. The first LPF 98 performs filtering on the audio signal, using a cutoff frequency of about 20 KHz. The output signal of the first LPF 98 is supplied via the first amplifier 99 to a first output terminal 100. The first output terminal 100 may be connected to an acoustic apparatus such as a loudspeaker or a headphone. Then, sound can be reproduced from the audio data that has been generated by adding the first information (first data) and the second information (second data).

The first data may be audio data representing an accompaniment separated from a musical piece composed of a song and an accompaniment, while the second data may be audio data representing the song. In this case, the multiplexer 94 adds the first information and the second information, reproducing a signal, if the reproduction-mode identification data Im designates the addition of the first and second information items. The audio data obtained by adding these information items represents a musical piece that is composed of the accompaniment and the song, which correspond to the first information and the second information, respectively.

The first data may be audio data representing a musical piece composed of a song and an accompaniment, while the second data may be audio data representing the song. In this case, the multiplexed 94 subtracts the second information from the first information, reproducing a signal, if the reproduction-mode identification data Im designates the subtraction of the second information from the first information. The audio data obtained by subtracting the second information from the first information represents a musical piece that is composed of only the accompaniment to the song.

The reproduction-mode selection button may be pushed, selecting the second data-reproducing mode designated by the reproduction-mode identification data Im recorded in the optical disc 21, in order to reproduce the first data and the second data independently of each other. In this case, the first data is supplied via the first error-correcting circuit 93 to the second error-interpolating circuit 195, and the second data is supplied via the second error-correcting circuit 193 to the third error-interpolating circuit 295. The second error-interpolating circuit 195 decodes the first data by using the CIRC algorithm, and the third error-interpolating circuit 295 decodes the second data by using the CIRC algorithm. The first data and the second data, thus decoded, are supplied to the second D/A converter 196 and the third D/A converter 296, respectively. The second D/A converter 196 converts the first data to an analog audio signal, and the third D/A converter 296 converts the second data to an analog audio data. One of these analog audio signals is supplied through the second aperture circuit 197 to the second low-pass filter (LPF) 198. The other analog audio signal is supplied through the third aperture circuit 297 to the third low-pass filter (LPF) 298. The second LPF 198 and the third LPF 298 perform filtering on the audio signals, respectively, using a cutoff frequency of about 20 KHz. The output signal of the second LPF 198 is supplied via the second amplifier 199 to the second output terminal 200. The output signal of the third LPF 298 is supplied via the third amplifier 299 to the third output terminal 300. The second output terminal 200 may be connected to an acoustic apparatus such as a loudspeaker or a headphone. Similarly, the third output terminal 300 may be connected to an acoustic apparatus such as a loudspeaker or a headphone. The signal output from the second output terminal 200 or the signal output from the third terminal 300 is selected, whereby sounds are reproduced from either the first data or the second data.

In the embodiment described above, this invention is applied to a compact disc and the music data recorded in the compact disc. Nonetheless, the present invention can be applied to any optical disc other than a compact disc. It can be applied to, for example, a CD-ROM and a DVD (Digital Versatile Disc, or Digital Video Disc). If the invention is applied to a DVD, the 8-to-16 modulation may be performed in place of the EFM modulation. Moreover, the present invention can be applied not only to music data, but also to the game program or navigation program, either recorded in a CD-ROM or the like.

The second data is recorded as the specific displacement of pits from the centerline of the track, in the direction at right angles to the track. Instead, the second data can be recorded as the deformation of a part or entirety of each pit. In this case, too, the pits are deformed, but not so much as to cause off-tracking of the reproducing laser beam.

INDUSTRIAL APPLICABILITY

The present invention can provide a recording medium from which data can be reproduced by the existing apparatuses, which can store data representing high-quality sounds, without shortening the program that can be recorded in it. The invention can also provide an apparatus and method for reproducing data from the recording medium.

Additionally, this invention can provide an optical recording medium from which the first data and the second data based on the first information and the second information, respectively, can be reproduced in various modes, thereby to provide various types of information.

Further, the present invention can record and reproduce the first data and the second data based on the first information and the second information, respectively, in and from an optical recording medium and in various modes, thereby to provide various types of information.

The invention claimed is:

1. A method for reproducing data from a recording medium having recorded thereon first data and second data and having recorded thereon content data representing contents of the first data, the first data being recorded in a form of a track consisting of a plurality of pits, the second data being recorded by displacing the pits from the track along a direction normal to the track, and the content data including identification data that indicates whether the second data is recorded on the recording medium and including reproduction-mode identification data representing a reproduction mode for reproducing the first data and the second data, said method comprising:

reading the identification data and the reproduction-mode identification data from the recording medium;

determining a type of the recording medium from the read reproduction-mode identification data when the read identification data indicates that the second data is recorded on the recording medium;

selecting, based on the determined type, reproduction of the first data and the second data read from the recording medium as two independent audio information items, multi-channel audio information items, an audio information item with text data or an audio information item with image data; and reproducing the first data and the second data read from the recording medium based on said selecting step.

2. The method of reproducing data from a recording medium according to claim 1, wherein the reproduction-mode identification data represents a first reproduction mode for reproducing a signal by performing an operation on the first data and on the second data, and a second reproduction mode for reproducing the first data, the second data, or both the first data and the second data.

3. The method of reproducing data from a recording medium according to claim 2, wherein when the reproduction-mode identification data represents the first reproduction mode, an operation is performed on two data items obtained by reproducing the first data and the second data read from the recording medium.

4. The method of reproducing data from a recording medium according to claim 3, wherein when the reproduction-mode identification data represents the second reproduction mode, either a first data item obtained by reproducing the first data or a second data item obtained by reproducing the second data is outputted.

5. The method of reproducing data from a recording medium according to claim 1, wherein the first data read from the recording medium is reproduced and outputted when the second data is not recorded on the recording medium.

6. An apparatus for reproducing data from a recording medium having recorded thereon first data and second data and having recorded thereon content data representing contents of the first data, the first data being recorded in a form of a track consisting of a plurality of pits, the second data being recorded by displacing the pits from the track along a direction normal to the track, and the content data including identification data that indicates whether the second data is recorded on the recording medium and including reproduction-mode identification data that represents a mode for reproducing the second data, said apparatus comprising:

a head section configured to apply a laser beam to scan the recording medium;

a reading section configured to read the identification data and the reproduction-mode identification data from the recording medium;

a selecting section;

a signal-reproducing section configured to reproduce a signal read from the recording medium by the head section; and a control section configured to determine a type of recording medium from the read reproduction-mode identification data when the read identification data indicates that the second data is recorded on the recording medium, to cause said selecting section to select, based on the determined type, reproduction of the first data and the second data read from the recording medium as two independent audio information items, multi-channel audio information items, an audio information item with text data or an audio information item with image data, and to cause the signal-reproducing section to reproduce the first data and the second data based on the selection carried out by said selecting section .

7. The apparatus for reproducing data according to claim 6, wherein the signal-reproducing section comprises:
   a first signal-processing section configured to perform at least demodulation of a first component of a signal outputted from the head section, and
   of a second signal-processing section configured to perform at least demodulation a second component of the signal outputted from the head section, the second component corresponding to the displacement of pits from the track along a direction normal to the track.

8. The apparatus for reproducing data according to claim 7, wherein said selecting section is controlled by said control section to select at least the data output from said first signal-processing section.

9. The apparatus for reproducing data according to claim 8, wherein said control section further controls said selecting section to select the data output from said first signal-processing section when the reproduction-mode identification data read from the recording medium by said head section represents a reproduction mode in which the first data, the second data, or both the first data and the second data are reproduced.

10. The apparatus for reproducing data according to claim 7, further wherein said selecting section is configured to supply the second signal-processing section with the second component of the signal in accordance with a control signal supplied from the control section, said component of the signal being one corresponding to the displacement of the pits from the track along the direction normal to the track.

11. The apparatus for reproducing data according to claim 6, wherein said control section outputs data outputted from said signal-reproducing section and corresponding to the first data read from the recording medium when the identification data read from the recording medium by said head section indicates that the second data is found not to be recorded on the recording medium.

* * * * *

UNITED STATES PATENT AND TRADEMARK OFFICE
CERTIFICATE OF CORRECTION

| | |
|---|---|
| PATENT NO. | : 7,130,252 B2 |
| APPLICATION NO. | : 10/088196 |
| DATED | : October 31, 2006 |
| INVENTOR(S) | : Yoichiro Sako |

It is certified that error appears in the above-identified patent and that said Letters Patent is hereby corrected as shown below:

On the Title Pages:
Replace the Abstract with --A recording medium in which data is recorded in the form of a track consisting of a plurality of bits. Second data is recorded on the medium in the form of a plurality of bits that are displaced in a direction normal to the track. Content data representing the contents of the first data is also recorded on the recording medium. The content data includes identification data that indicates whether the second data is recorded on the recording medium.--

Column 5, line 51, after "pits.", insert the following new paragraph:
--The TOC data thus generated contains the reproduction-mode identification data Im representing the modes of reproducing the first data and second data that are recorded in the recording area 53 of the optical disc 21. As mentioned above, the first data consists of 16 bits, whereas the second data consists of four bits. Hence, 20-bit audio data of high quality can be reproduced from the optical disc 21. The data Im represents two data-reproducing modes. In the first mode, the data-reproducing section incorporated in a data-reproducing apparatus combines the first data and the second data and outputs the combined data. In the second mode, the data-reproducing apparatus reproduces the first data only, providing an audio signal of the same quality as can be reproduced from ordinary CDs.--

Column 5, lines 57-61, delete "The second mode represented by the reproduction-mode identification data Im may be of such a type as causes the data-reproducing apparatus to output both the first data and the second data when theses data items correspond to two independent audio information items."

Column 13, line 39, change "bow" to --how--.

Column 23, line 6, delete "of".

UNITED STATES PATENT AND TRADEMARK OFFICE
CERTIFICATE OF CORRECTION

PATENT NO.       : 7,130,252 B2
APPLICATION NO.  : 10/088196
DATED            : October 31, 2006
INVENTOR(S)      : Yoichiro Sako It is certified that error appears in the above-identified patent and that said Letters Patent is hereby corrected as shown below:

Column 23, line 7, after "demodulation", insert --of--.

Signed and Sealed this

Twentieth Day of November, 2007

JON W. DUDAS
*Director of the United States Patent and Trademark Office*